United States Patent [19]
Hibino et al.

[11] Patent Number: 5,788,277
[45] Date of Patent: Aug. 4, 1998

[54] TILT TYPE STEERING APPARATUS

[75] Inventors: Tadashi Hibino, Gunma-ken; Sakae Matsumoto, Takasaki, both of Japan

[73] Assignee: NSK Ltd., Tokyo, Japan

[21] Appl. No.: 616,204

[22] Filed: Mar. 15, 1996

[30] Foreign Application Priority Data

| Mar. 30, 1995 | [JP] | Japan | 7-073132 |
| Apr. 12, 1995 | [JP] | Japan | 7-086927 |
| Apr. 27, 1995 | [JP] | Japan | 7-104312 |
| Jun. 14, 1995 | [JP] | Japan | 7-147803 |

[51] Int. Cl.⁶ .................................................. B62D 1/18
[52] U.S. Cl. ........................... 280/775; 74/493; 403/155
[58] Field of Search ........................ 280/775; 74/493; 403/154, 155

[56] References Cited

U.S. PATENT DOCUMENTS

| 3,747,426 | 7/1973 | Schluckebier | 74/492 |
| 4,137,603 | 2/1979 | Kvasnes | 403/155 |
| 4,594,909 | 6/1986 | Yamaguchi | 280/775 |
| 4,637,741 | 1/1987 | Gillet | 403/155 |
| 4,762,015 | 8/1988 | Katayama | 280/775 |
| 4,938,093 | 7/1990 | Matsumoto et al. | 74/493 |
| 5,005,862 | 4/1991 | Yamaguchi | 280/775 |

FOREIGN PATENT DOCUMENTS

| 0 143 054 | 5/1985 | European Pat. Off. |
| 1-127453 | 5/1989 | Japan |
| 2-34145 | 9/1990 | Japan |
| 7-81584 | 3/1995 | Japan |
| 7-329795 | 12/1995 | Japan |
| 561012 | 5/1944 | United Kingdom |

Primary Examiner—Peter C. English
Attorney, Agent, or Firm—Shapiro and Shapiro

[57] ABSTRACT

In order to facilitate the work of pivotally supporting the fore end portion of a rear steering column relative to a support bracket, the small-diametered portions of a pair of right and left pivot pins are inserted into small-diametered circular holes formed in a rear steering column. The large-diametered portions of the pair of right and left pivot pins are forced into large-diametered circular holes in the support bracket. The intermediate portions of spring pins forced from above into restraining holes formed in a vertical direction are brought into engagement with restraining concave grooves formed in the aforementioned large-diametered portions.

2 Claims, 18 Drawing Sheets

TILT TYPE STEERING APPARATUS

BACKGROUND OF THE INVENTION

1. Field of the Invention

This invention relates to a tilt type steering apparatus for a vehicle.

2. Related Background Art

There is known a height adjusting apparatus for a steering wheel called the tilt type steering apparatus adapted to be capable of changing the height of a steering wheel in conformity with the constitution, driving posture or the like of a driver. As such a tilt type steering apparatus, there is known one described, for example, in Japanese Utility Model Publication No. 2-34145.

The tilt type steering apparatus described in this publication is called the swing type and is constructed as shown in FIGS. 5 to 8 of the accompanying drawings. A steering column 2 formed into a cylindrical shape to insert a steering shaft 1 thereinto is bisected into a fore steering column 3 and a rear steering column 4. These two steering columns 3 and 4 are connected together by a support bracket 5 fixedly supported on a vehicle body. The rear steering column 4 is pivotally movable about pivot pins 6 and 6 provided coaxially with each other on the support bracket These pivot pins 6 and 6 are made into a bolt-like shape and have pillar portions 24 and 24 formed between large-diametered heads 22, 22 formed on the outer end portions thereof and externally threaded portions 23, 23 formed on the tip end portions thereof. The outer diameter of these pillar portions 24, 24 is larger than the outer diameter of the externally threaded portions 23, 23 and is smaller than the outer diameter of the heads 22, 22. The pivot pins 6, 6 are such that with the externally threaded portions 23, 23 threadably engaged with and fastened in threaded holes 25, 25 formed in the rear steering column 4, the pillar portions 24, 24 are positioned in circular holes 26, 26 formed in the support bracket 5. Accordingly, the rear steering column 4 becomes pivotally movable about the pivot pins 6, 6.

A restraining mechanism engageable by a tilt lever 7 pivotally movable about the pins 6, 6 is provided between the support bracket 5 and the rear steering column 4. Describing an example of this restraining mechanism in detail, one end of the rear steering column 4 is pivotally supported on the support bracket 5 by the pivot pins 6, 6 provided on the support bracket 5 fixed to a vehicle body on the underside or the like of a dashboard 8, and also a first engagement member 9 is fixed to the underside of the rear steering column 4. The underside of this first engagement member 9 is formed as an arcuately concave surface centering around the pivot pins 6, 6 and first engagement teeth 10 are formed on this underside.

On the other hand, one end (the left end as viewed in FIGS. 6 and 8) of a second engagement member 12 engageable with the engagement member 9 with the pivotal movement of the tilt lever 7 is pivotally supported on a lateral shaft 11 provided on the support bracket 5. Second engagement teeth 13 engageable with the first engagement teeth 10 formed on the underside of the first engagement member 9 are formed on the upper edge of the other end portion (the upper edge of the right end portion as viewed in FIG. 6) of the second engagement member 12. A roller 15 is supported on a shaft 14 having its end portion coupled to the lower end portion of the tilt lever 7 having its intermediate portion pivotally supported on the pivot pins 6, 6, and the upper surface of this roller 15 bears against the underside of the second engagement member 12. Further, a pin 18 protruding from the side of the second engagement member 12 is engaged with an inclined slot 17 formed in a rockable plate 16 fixed to the tilt lever 7.

With the construction as described above, when the tilt lever 7 is pivotally moved in a counter-clockwise direction as viewed in FIG. 6, the roller 15 retracts from below the other end portion (the right end portion as viewed in FIG. 6) of the second engagement member 12 and at the same time, the other end portion of the second engagement member 12 is downwardly displaced on the basis of the engagement between the inclined slot 17 and the pin 18. As a result, the engagement between the second engagement teeth 13 formed on the upper surface of the other end portion of the second engagement member 12 and the first engagement teeth 10 on the underside of the first engagement member 9 fixed to the underside of the rear steering column 4 is released (within such a range that a pin 19 projectedly provided on the side of the rear steering column 4 can be displaced inside an arcuate slot 20 formed in the support bracket 5) and the rear steering column 4 becomes pivotally movable about the pivot pins 6, 6. On the basis of this pivotal movement, the height position of a steering wheel fixed to the end portion of the steering shaft 1 inserted in the rear steering column 4 becomes adjustable.

When the height position of the steering wheel is adjusted in this manner, the tilt lever 7 is pivotally moved in a clockwise direction as viewed in FIG. 6. With this pivotal movement, the roller 15 comes into below the other end portion of the second engagement member 12 and pushes up the other end portion of this second engagement member 12, thereby bringing the second engagement teeth 13 formed on the upper surface of this other end portion into engagement with the first engagement teeth 10 formed on the underside of the first engagement member 9 fixed to the underside of the rear steering column 4. As a result, the rear steering column 4 is prevented from rotating about the pivot pins 6, 6 and holds the steering wheel at its adjusted height position. In this state, a resilient force which tends to pivotally move the tilt lever 7 in the clockwise direction as viewed in FIG. 6 is imparted to the tilt lever 7 by a tension spring 21 and therefore, it does not happen that the roller 15 inadvertently retracts from below the second engagement member 12.

(i) However, in the case of a pivotally supporting apparatus incorporated in the prior-art tilt type steering apparatus constructed and used as described above and pivotally supporting the fore end portion of the rear steering column 4, the assembling work has been cumbersome and the efficiency of the work of manufacturing the tilt type steering apparatus has been bad. That is, in the case of the prior-art apparatus, the work of bringing the externally threaded portions 23, 23 of the pivot pins 6, 6 into threadable engagement with threaded holes 25, 25 formed in the right and left sides of the rear steering column 4 and fastening them becomes necessary. This threadably engaging and fastening work need be done with a predetermined tightening torque to prevent the pivot pins 6, 6 from being loosened and coming off or from being tightened too much to thereby damage the threads, and is cumbersome.

In contrast, Japanese Patent Application No. 5-230026, as shown in FIG. 9 of the accompanying drawings, describes a structure in which a rear steering column 4a is pivotally supported on a support bracket 5a by pivot pins 6a, 6a having large-diametered portions 27, 27 and small-diametered portions 28, 28 connected together by stepped portions 29, 29. In this structure, the large-diametered portions 27, 27 are fitted in and fixed to circular holes 31, 31 formed in the support bracket 5a and reinforcing plates 30, 30 and also, the small-diametered portions 28, 28 are inserted in cylindrical sleeves 32, 32 supported on both side walls of the rear steering column 4a. Portions of the reinforcing plates 30, 30 are caulked diametrally inwardly of the circular holes 31, 31 to thereby achieve the anti-slippage of the pivot pins 6a, 6a.

In the case of the structure as shown in FIG. 9, the work of pressing or inserting the pivot pins 6a, 6a into the circular holes 31, 31 and the sleeves 32, 32 is easy, but the work of caulking portions of the reinforcing plates 30, 30 to prevent the slippage of the pivot pins 6a, 6a is cumbersome. Particularly, portions of the pair of reinforcing plates 30, 30 provided with the hollow tubular rear steering column 4a interposed therebetween are caulked and therefore, when the rigidity of the rear steering column 4a is insufficient, it is necessary to achieve the prevention of the deformation of this rear steering column 4a as by inserting a receiving mold into the rear steering column 4a. The work of putting such a receiving mold into and out of the rear steering column is cumbersome and it also makes the efficiency of the work of manufacturing the tilt type steering apparatus bad.

(ii) In the case of the prior-art tilt type steering apparatus shown in FIGS. 5 to 8, not only the assembling work has been cumbersome and the efficiency of the work of manufacturing the tilt type steering apparatus has been bad, but also the width dimension thereof has been large and therefore the space for installation has unavoidably been increased. That is, in the case of the prior-art apparatus, the work of bringing the externally threaded portions 23, 23 of the pivot pins 6, 6 into threadable engagement with the threaded holes 25, 25 formed in the right and left sides of the rear steering column 4 and fastening them becomes necessary. This threadably engaging and fastening work need be done with a predetermined tightening torque to prevent the pivot pins 6, 6 from being loosened and coming off or from being tightened too much to thereby damage the threads, and is cumbersome. Also, the heads 22, 22 of the pivot pins 6, 6 protrudes greatly from the outer side of the tilt lever 7 and therefore, the maximum width dimension of the tilt type steering apparatus becomes large. Therefore, in some cases, the design for enabling the apparatus to be installed in a limited space as under the dashboard becomes cumbersome.

(iii) In the case of the tilt type steering apparatus shown in FIGS. 5 to 8, it is necessary to provide a spring between the portion fixed to the support bracket 5 and the portion fixed to the rear steering column 4 and support the weight of the portion pivotally moved about lateral shafts 6, 6 with the rear steering column 4. The reason for this is as follows. The steering shaft 1 and the steering wheel 25 are supported on the rear steering column 4 pivotally movable about the lateral shafts 6, 6. Therefore, the weight of the portion pivotally moved about the lateral shafts 6, 6 increases considerably. Accordingly, unless this weight is supported by a spring, as soon as the engagement of the aforedescribed restraining mechanism is released, the rear steering column 4 will downwardly rock forcibly to thereby hit a driver's foot or the like with force. Also, the driver will have to adjust the height position of the steering wheel while supporting this great weight, and the adjusting work becomes cumbersome.

As the spring for supporting the weight of the rear steering column 4, use is made of a tension spring or a compression coil spring. When a tension spring is used, this tension spring is disposed on the upper side of the steering column 2. In contrast, when a sufficient space cannot be secured on the upper side of the steering column 2, a compression coil spring is disposed on the lower side of the steering column 2. FIGS. 16 and 17 of the accompanying drawings show a prior-art structure in which for such a purpose, a compression coil spring 226 is disposed on the lower side of a steering column 202.

The fore end portion (the left end portion as viewed in FIG. 16) of the compression coil spring 226 resiliently bears against the rear side (the left side as viewed in FIG. 16) of a fixed side receiving piece 227 secured to a portion of a support bracket 205 and downwardly protruding from the fore end portion (the left end portion as viewed in FIG. 16) of the support bracket 205. A bent-up piece 231 is bent up on the rear side of the fixed side receiving piece 227 at a right angle with respect to this rear side. The fore end portion of the compression coil spring 226 is fitted on the bent-up piece 231. The rear end portion (the right end portion as viewed in FIG. 16) of the compression coil spring 226 resiliently bears against the fore side (the left side as viewed in FIG. 16) of a pivotal movement side receiving piece 230 secured to a pivotally movable bracket 229 constituting a rear steering column 204a with a column tube 228 and downwardly protruding from the fore end portion (the left end portion as viewed in FIG. 16) of the pivotally movable bracket 229. A circular concave hole 232 is formed in the fore side of the pivotal movement side receiving piece 230 in a direction perpendicular to this fore side. The rear end portion of the compression coil spring 226 is fitted in the concave hole 232. By the compression coil spring 226 being assembled in this manner, this compression coil spring 226 resiliently stretches between the fixed side receiving piece 227 and the pivotal movement side receiving piece 230 and supports the weight of the portion pivotally moved about the lateral shafts 206, 206 with the rear steering column 204a.

In the case of such prior-art structure shown in FIGS. 16 and 17, when the rear steering column 204a is in its neutral state (a state in which the center axis of the fore steering column 203 and the center axis of the rear steering column 204a are made coincident with each other and the height of the steering wheel is in an intermediate position), the center axis of the compression coil spring 226 lies on a straight line from its fore end to its rear end. In other words, the center of the bent-up piece 231 and the center of the concave hole 232 lie on a straight line, and the center axis of the fore end portion of the compression coil spring 226 and the center axis of the rear end portion of this compression coil spring 226 coincide with each other. When from such a neutral state, the rear steering column 204a is pivotally moved in a counter-clockwise direction to elevate the height position of the steering wheel, the compression coil spring 226 becomes curved in a direction for the underside thereof to become arcuately convex as shown in FIG. 18 of the accompanying drawings. In contrast, when the rear steering column 204a is pivotally moved in a clockwise direction to lower the height position of the steering wheel, the compression coil spring 226 becomes curved in a direction for the upper side thereof to become arcuately convex as shown in FIG. 19 of the accompanying drawings. A structure using the compression coil spring 226 which becomes straight in the neutral position in this manner to support the weight of the rear steering column 204a is described, for example, in Japanese Patent Application Laid-Open No. 1-127453.

In the structure shown in FIGS. 16 to 19, the structure of a restraining mechanism provided between the portion fixed to the rear steering column 204a and the portion fixed to the fore steering column 203 somewhat differs from the structure shown in FIGS. 5 to 8. That is, in the structure shown in FIGS. 16 to 19, a first engagement member 209a having first engagement teeth 210a which are straight in the form of a rack formed on the underside thereof is fixed to the underside of a support bracket 205 fixed to the rear end portion of the fore steering column 203. Also, the rear end portion of a second engagement member 212a having second engagement teeth 213a which also are straight in the form of a rack formed on the upper surface of the fore end portion thereof is pivotally supported on the underside of the fore end portion of the rear steering column 204a. The first and second engagement teeth 210a and 213a are engageable with each other by a tilt lever, not shown. Such a restraining mechanism is not an essential portion of FIG. 16–19, but its action itself is similar to that of the structure shown in FIGS. 5 to 8. Further, more specific structure of the restraining mechanism shown in FIGS. 16 to 19 is described in detail in Japanese Patent Application No. 6-123907 and therefore need not be described in detail herein.

In the case of the prior-art tilt type steering apparatus constructed and used as described above, the compression coil spring 226 produces unusual sound with the pivotal movement of the rear steering column 204a. That is, when the directions of forces applied from the opposite ends of the compression coil spring 226 are continuously changed while a force in a compressing direction is applied to the compression coil spring 226, the compression coil spring 226 vibrates at the moment when the neutral position is cleared. For example, when the rear steering column 204a is changed from the state shown in FIG. 18 to the state shown in FIG. 19 via the state shown in FIG. 16, the direction of curve of the compression coil spring 226 suddenly changes at the moment when the neutral position shown in FIG. 16 is passed, and this compression coil spring 226 vibrates. On the basis of this vibration, the compression coil spring 226 produces unusual sound which gives an unpleasant feeling to a crew such as a driver. Of course, such unusual sound is also produced when the rear steering column is changed from the state shown in FIG. 19 to the state shown in FIG. 18 via the state shown in FIG. 16.

In order to prevent the production of such unpleasant unusual sound, a member having a damping property such as a rubber tube has heretofore been put over the compression coil spring 226 or the end surface of the compression coil spring 226 and the inner peripheral side of the coil portion have heretofore been guided by a member made of synthetic resin. However, such prior-art structure requires discrete parts for preventing the production of unusual sound, which is the cause of the increased manufacturing costs of the tilt type steering apparatus.

(iv) In the case of the prior-art tilt type steering apparatus shown in FIGS. 5 to 8, it is difficult to both reduce costs and improve a feeling of operation. That is, to prevent the backlash of the steering wheel with the height position of the steering wheel fixed, it is necessary for the fixed side meshing teeth 10 and the displacement side meshing teeth 13 to mesh with each other reliably without any backlash (deeply). For this purpose, it is necessary that the directions of the meshing teeth 10 and 13 be made coincident with each other. If the directions of these meshing teeth 10 and 13 deviate from each other, the meshing engagement between these meshing teeth 10 and 13 will become unreliable (the meshing teeth 10 and 13 will mesh with each other only shallowly) even if the other end portion of the engagement member 12 is brought close to the restraining member 9, and this is liable to become the cause of the backlash of the steering wheel. Also, a feeling of moderation will become null as to the pivotal movement of the tilt lever 7 and this becomes the cause of a feeling of physical disorder given to the operator.

On the other hand, a plurality of members (in the case of the structure of FIGS. 6 to 8, the rear steering column 4, the lateral shafts 6, 6, the support bracket 5, and the lateral shaft 11) are present between the restraining member 9 provided with the fixed side meshing teeth 10 and the engagement member 12 provided with the displacement side meshing teeth 13. Therefore, the directions of the meshing teeth 10 and 13 are liable to deviate from each other on the basis of the shapes and dimensional errors of these members 4, 6, 5 and 11. In other words, to make the directions of the meshing teeth 10 and 13 coincident with each other, it is necessary to regulate the shapes and dimensional accuracy of these members 4, 6, 5 and 11 considerably strictly. It becomes the cause of the increased manufacturing costs of the members and accordingly the increased manufacturing costs of the tilt type steering apparatus to regulate the shapes and dimensional accuracy of the plurality of members 4, 6, 5 and 11 thus strictly, and this is not preferable.

SUMMARY OF THE INVENTION

It is an object of the present invention to provide a support apparatus for tilt type steering which is easy to assemble.

It is another object of the present invention to provide a tilt type steering apparatus which is easy to assemble and compact and can be installed in a limited space.

It is still another object of the present invention to provide a tilt type steering apparatus in which the production of unpleasant sound is effectively prevented.

It is yet still another object of the present invention to provide a tilt type steering apparatus of which the manufacturing costs are suppressed and in which teeth can be brought into meshing engagement with each other without any backlash.

The support apparatus for tilt type steering of the present invention, like the aforedescribed priorart pivotally movable support apparatus for a tilt type steering apparatus, is provided with a support bracket supported on and fixed to a vehicle body, a pair of vertical plate portions provided on the support bracket in parallelism to each other with a spacing therebetween, a steering column disposed between the pair of vertical plate portions, and a pair of pivot pins disposed coaxially with each other and extended between the right and left sides of the steering column and the pair of vertical plate portions.

Particularly, in the pivotally movable support apparatus for tilt type steering of the present invention, the steering column is provided with a pair of small-diametered circular holes coaxially with each other, and the end portions of the pair of small-diametered circular holes open into the right and left sides of the steering column. Also, a pair of large-diametered circular holes are formed in portions fixed to the vertical plate portions and aligned with the small-diametered circular holes. The pair of pivot pins each comprise a small-diametered portion and a large-diametered portion connected together by a stepped portion, and with the large-diametered portions pressed into the large-diametered circular holes, the small-diametered portions are inserted in the small-diametered circular holes for relative rotation. A restraining concave groove is formed in the outer peripheral surface of the intermediate portion of each of the large-diametered portions over the entire periphery thereof, and a restraining hole is formed in a portion of each of the vertical plate portions in twisted positional relationship with (having an axis transverse to that of) the large-diametered circular hole, and a portion of each of a pair of restraining pins inserted in each restraining hole comes into the restraining concave groove.

The action itself when the steering column is pivotally supported relative to the support bracket by the pivotally movable support apparatus for tilt type steering of the present invention constructed as described above is similar to that in the case of the aforedescribed prior-art pivotally movable support apparatus for a tilt type steering apparatus. However, in the case of the pivotally movable support apparatus for tilt type steering of the present invention, the assembling work is easy and the high efficiency of the work of manufacturing the tilt type steering apparatus can be achieved.

The tilt type steering apparatus of the present invention, like the aforedescribed prior art tilt type steering apparatus, is provided with a support bracket supported on and fixed to a vehicle body, a pair of vertical plate portions provided on the support bracket in parallelism to each other with a spacing therebetween, a steering column disposed between the pair of vertical plate portions, a pair of pivot pins disposed coaxially with each other and extended between the right and left sides of the steering column and the pair of vertical plate portions, a restraining mechanism provided between the support bracket and the steering column for blocking the pivotal movement of the steering column about the pair of pivot pins during engagement, and a tilt lever for releasing the engagement of the restraining mechanism with the pivotal movement thereof.

However, in the tilt type steering apparatus of the present invention, the tilt lever is provided with a pair of pivotally movable arm portions parallel to each other, a pair of circular holes formed in the tip end portions of these pivotally movable arm portions, and a connecting plate portion connecting the base end portions of the pivotally movable arm portions together. Also, the outer end portions of the pivot pins protrude from the outer sides of the vertical plate portions by an amount equal to or less than the plate thickness of each of the pivotally movable arm portions. The circular holes are fitted on the outer end portions of the pivot pins, whereby the tilt lever is supported for pivotal movement about the pair of pivot pins.

The action itself when the height position of a steering wheel is adjusted by the tilt type steering apparatus of the present invention constructed as described above is similar to that in the case of the aforedescribed prior-art tilt type steering apparatus. However, in the case of the tilt type steering apparatus of the present invention, the assembling work is easy and the high efficiency of the work of manufacturing the tilt type steering apparatus can be achieved. Also, the maximum width dimension can be made small and therefore, a design for enabling the apparatus to be installed in a limited space becomes easy.

The tilt type steering apparatus of the present invention, like the aforedescribed prior-art tilt type steering apparatus, is provided with a fore steering column, a fore steering shaft supported inside the fore steering column for rotation only, a support bracket fixed to a vehicle body with the rear end portion of the fore steering column supported and fixed, a lateral shaft provided on a portion fixed to the support bracket, a rear steering column having its fore end pivotally supported by the lateral shaft, a rear steering shaft supported inside the rear steering column for rotation only, a universal joint connecting the fore end portion of the rear steering shaft and the rear end portion of the fore steering shaft together, a restraining mechanism provided between a portion fixed to the rear steering column and a portion fixed to the fore steering column for blocking the pivotal movement of the rear steering column about the lateral shaft during engagement, and a compression coil spring having its fore end portion and its rear end portion resiliently bearing against the portion fixed to the support bracket and the portion fixed to the rear steering column, respectively, and supporting the weight of a portion pivotally movable about the lateral shaft with the rear steering column.

However, in the tilt type steering apparatus of the present invention, the center axis of the fore end portion of the compression coil spring and the center axis of the rear end portion of the compression coil spring are incoincident with each other over the whole range of the pivotal movement of the rear steering column about the lateral shaft. Moreover, the center axis of the above-mentioned fore end portion is displaced in the same direction over the above-mentioned whole range of the pivotal movement, relative to the center axis of the above-mentioned rear end portion.

The action itself when the height position of a steering wheel is adjusted in conformity with a driver' constitution or the like by the tilt type steering apparatus of the present invention constructed as described above is similar to that of the aforedescribed prior-art structure. However, in the case of the tilt type steering apparatus of the present invention, the compression coil spring supporting the weight of the portion pivotally movable about the lateral shaft with the rear steering column is displaced in the same direction over the whole range of the pivotal movement and therefore, it does not happen that this compression coil spring vibrates greatly. Therefore, the compression coil spring can be prevented from producing unpleasant unusual sound without using any discrete part for the prevention of vibration.

The tilt type steering apparatus of the present invention, like the aforedescribed prior-art tilt type steering apparatus, is provided with a fore steering column, a fore steering shaft supported inside the fore steering column for rotation only, a support bracket fixed to a vehicle body with the rear end portion of the fore steering column supported and fixed, a first lateral shaft provided on a portion fixed to the support bracket, a rear steering column having its fore end pivotally supported by the first lateral shaft, a rear steering shaft supported inside the rear steering column for rotation only, a universal joint connecting the fore end portion of the rear steering shaft and the rear end portion of the fore steering shaft together, a second lateral shaft provided on a portion fixed to one member of the rear steering column and the support bracket, an engagement member having one end portion thereof pivotally supported on the second lateral shaft and having the other end portion thereof formed with rack-like displacement side meshing teeth, a restraining member provided a portion fixed to the other member of the rear steering column and the support bracket and opposed to the displacement side meshing teeth and having rack-like fixed side meshing teeth engageable with the displacement side meshing teeth, and a tilt lever for bringing the displacement side meshing teeth and the fixed side meshing teeth into and out of engagement with each other with the pivotal movement thereof.

However, in the tilt type steering apparatus of the present invention, the restraining member is supported on and fixed to said other member for adjustment of the angle of inclination with respect to the direction of tooth trace of the fixed side meshing teeth. For this purpose, for example an uneven engagement portion for restraining one end portion of the restraining member for pivotal movement with respect to the direction of tooth trace of the fixed side meshing teeth is provided between one end portion of the restraining member and said other member. Also, a through-hole is formed in the other end portion of the restraining member, and a fixing bolt having an outer diameter smaller than the inner diameter of the through-hole extending widthwisely of the restraining member is inserted in the through-hole. The other end portion of the restraining member can be supported on and fixed to said other member on the basis of the fastening of the fixing bolt.

The action itself when the height position of a steering wheel is adjusted in conformity with a driver's constitution or the like by the tilt type steering apparatus of the present invention constructed as described above is similar to that of the aforedescribed prior-art tilt type steering apparatus. However, in the case of the tilt type steering apparatus of the present invention, even if the shape accuracy and dimensional accuracy of the constituents thereof are not made high, the direction of the displacement side meshing teeth and the direction of the fixed side meshing teeth can be made strictly coincident with each other and these meshing teeth can be reliably brought into meshing engagement with each other without any backlash.

That is, by the mounted position of the restraining member with respect to said other member being adjusted with respect to the direction of tooth trace of the fixed side meshing teeth, the direction of the fixed side meshing teeth and the direction of the displacement side meshing teeth can be made strictly coincident with each other. For this purpose, for example, the fixed side meshing teeth and the displacement side meshing teeth are brought into meshing engagement with each other with the restraining member rendered pivotally movable about the uneven engagement portion. The restraining member is pivotally movable about the uneven engagement portion within a range in which the fixing bolt is displaceable inside the through-hole with respect to the direction of tooth trace of the fixed side meshing teeth and therefore, the direction of the displacement side meshing teeth and the direction of the fixed side meshing teeth become strictly coincident with each other, and these meshing teeth reliably mesh with each other without any backlash. So, if with the meshing teeth kept in their meshing state, the fixing bolt is fastened and the other end portion of the restraining member is supported on and fixed to said other member, this restraining member can be supported on and fixed to said other member with the fixed side meshing teeth and the displacement side meshing teeth reliably meshing with each other.

DESCRIPTION OF THE PREFERRED EMBODIMENTS

Figure 1:
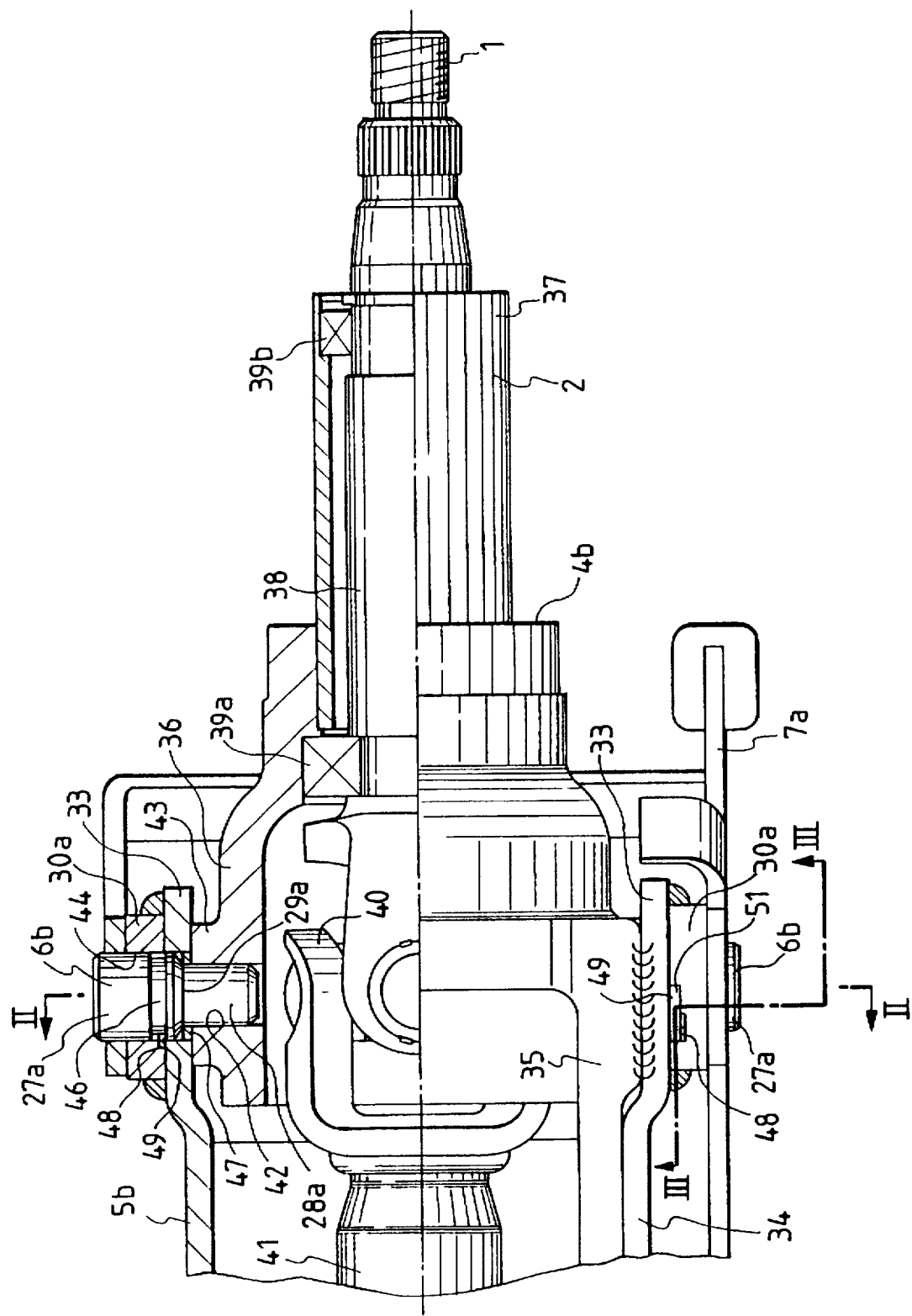
FIG. 1 is a half transverse cross-sectional view showing a first embodiment of the present invention.
Figure 2:
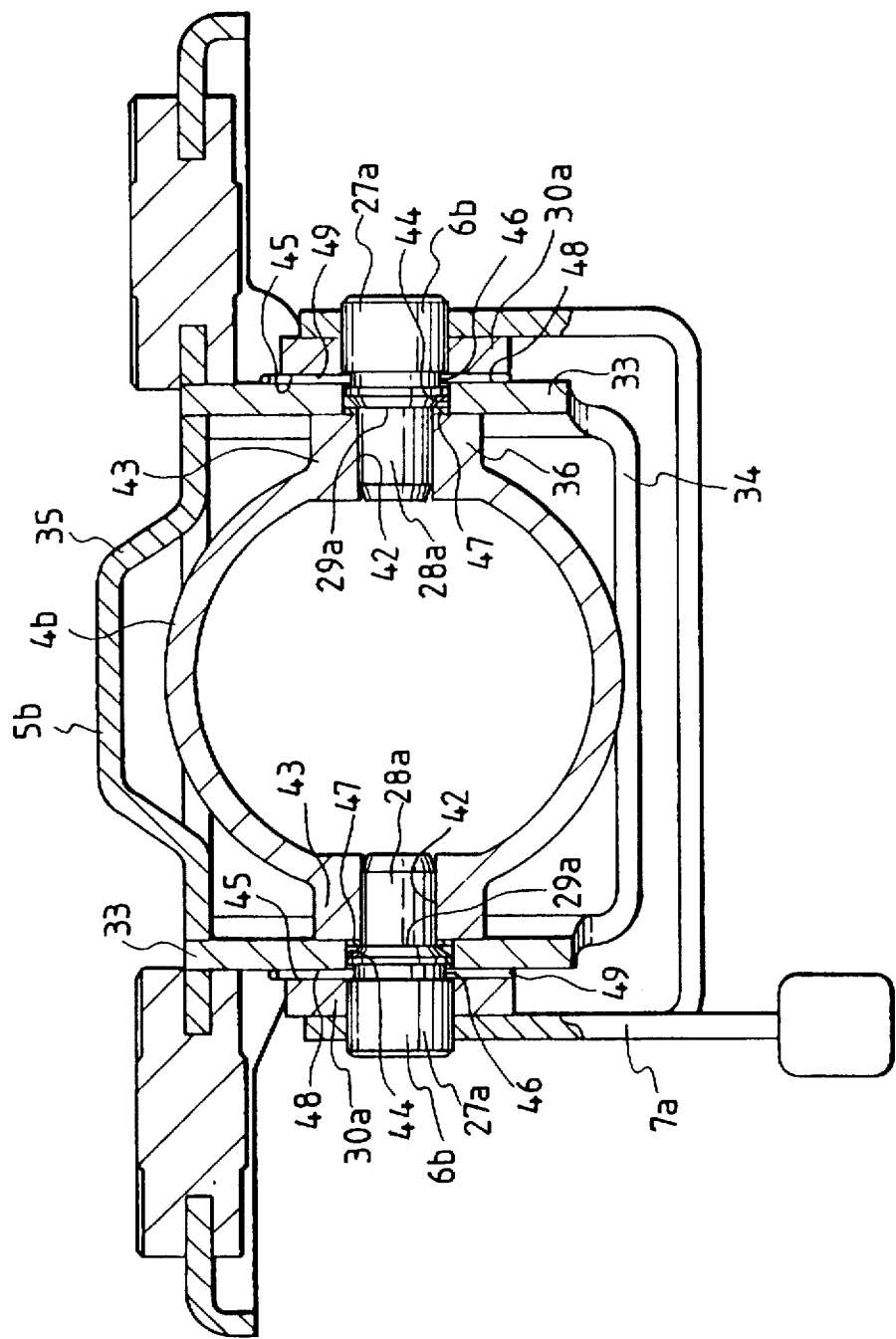
FIG. 2 is a cross-sectional view taken along the line II—II of FIG. 1 with some portions omitted.
Figure 3:
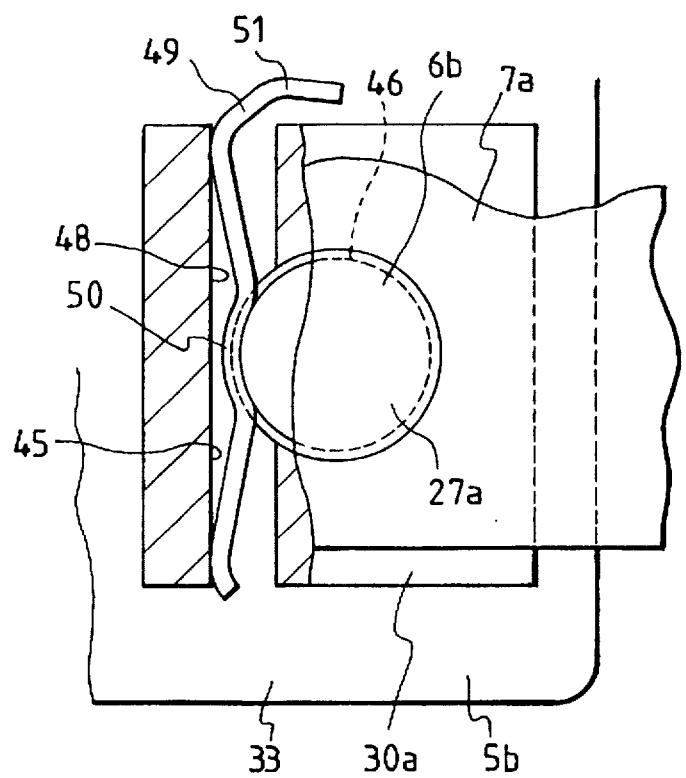
FIG. 3 is an enlarged cross-sectional view taken along the line III—III of FIG. 1.

FIGS. 1 to 3 show a first embodiment of the present invention. On a support bracket 5b fixedly supported on a vehicle body side, a pair of right and left vertical plate portions 33 and 33 are provided at an interval in parallelism to each other. In the case of the shown embodiment, this support bracket 5b comprises a holding portion 34 formed into a U-shape by bending a sufficiently rigid steel plate, and a mounting plate portion 35 welded and fixed to the upper end edge of the holding portion 34. During the assembly of a tilt type steering apparatus, the mounting plate portion 35 is supported on the vehicle body by bolts, not shown. Also, the fore end portion (the left end portion as viewed in FIG. 1) of a rear steering column 4b constituting the rear portion of a steering column 2 is pivotally held inside the mounting plate portion 34 by a pair of right and left pivot pins 6b and 6b disposed coaxially with each other. That is, the pair of pivot pins 6b and 6b are extended between the right and left sides of the fore end portion of the rear steering column 4b and the pair of vertical plate portions 33, 33.

The rear steering column 4b is comprised of a pivotally movable bracket 36 made by die-casting an aluminum alloy, and a column tube 37 having its fore end portion fitted and fixed to the pivotally movable bracket 36. Inside such a rear steering column 4b, a rear steering shaft 38 is supported for rotation only by a pair of fore and rear bearings 39a and 39b. The fore end portion of the rear steering shaft 38 is connected to the rear end portion (the right end portion as viewed in FIG. 1) of a fore steering shaft 41 through a universal joint 40. The center of displacement of the universal joint 40 lies on the extension of the center line of the pair of pivot pins 6b and 6b.

In order to pivotally support the fore end portion of the rear steering column 4b thus constructed and supporting the rear steering shaft 38, by the pair of pivot pins 6b and 6b, a pair of small-diametered circular holes 42 and 42 coaxial with each other are formed in the right and left sides of the fore end portion of the rear steering column 4b. That is, thick portions 43 and 43 are formed on the right and left sides of the fore end portion of the pivotally movable bracket 36 and the small-diametered circular holes 42 and 42 are formed coaxially with each other in the thick portions 43 and 43. These small-diametered circular holes 42 and 42 are formed so as to extend through the thick portions 43 and.43, and the outer end portions of the small-diametered circular holes 42 and 42 open into the right and left outer sides of the fore end portion of the pivotally movable bracket 36.

On the other hand, reinforcing plates 30a and 30a are welded and fixed to the right and left outer sides of the rear end portions of the vertical plate portions 33 and 33. A pair of large-diametered circular holes 44 and 44 are formed through the inner sides of the vertical plate portions 33 and 33 to the outer sides of the reinforcing plates 30a and 30a. Concave grooves 45 extending through the reinforcing plates 30a and 30a from the upper surfaces to the lower surfaces thereof are formed in the inner sides of portions of the reinforcing plates 30a and 30a. The openings in the inner sides of the concave grooves 45 are closed by the vertical plate portions 33 and 33 to thereby form restraining holes 48 vertically extending through the reinforcing plates 30a and 30a. These restraining holes 48 are formed in twisted positional relationship with (having an axis transverse to that of) the large-diametered circular holes 44 and 44, and the vertically intermediate portions thereof open into the inner peripheral surfaces of the intermediate portions of the large-diametered circular holes 44 and 44.

The pair of pivot pins 6b and 6b have their small-diametered portions 28a, 28a and large-diametered portions 27a, 27a connected together by stepped portions 29a and 29a. Such pivot pins 6b and 6b each are made as a unit, for example, by precutting stainless steel, an aluminum alloy or the like, die-casting an aluminum alloy, or the injection molding of synthetic resin. With the large-diametered portions 27a and 27a forced into the large-diametered circular holes 44 and 44, the small-diametered portions 28a and 28a are inserted in the small-diametered circular holes 42 and 42 for relative rotation. Spacers 47 and 47 made of a slippery material such as synthetic resin and formed into a circular ring-like shape are sandwiched between the stepped portions 29a, 29a and the thick portions 43, 43. These spacers 47 and 47 serve to mitigate friction acting between the stepped portions 29a, 29a which are not displaced even during the tilting operation and the outer sides of the thick portions 43, 43 which are displaced during the tilting operation.

Further, restraining concave grooves 46, 46 are formed in the outer peripheral surfaces of the intermediate portions of the large-diametered portions 27a, 27a over the entire circumference thereof. These restraining concave grooves 46, 46 align with the intermediate portions of the restraining holes 48 which open into the inner peripheral surfaces of the large-diametered circular holes 44, 44 with the stepped portions 29a, 29a rammed against the outer sides of the thick portions 43, 43 through the spacers 47, 47. Spring pins 49, 49 are pushed in such restraining holes 48 from the upper end openings in the restraining holes 48. These spring pins 49, 49 are formed with curved portions 50 engageable with the restraining concave grooves 46, 46 in the intermediate portions thereof, and impart a resilient force in a direction away from the curved portions 50 to the upper and lower end portions of the restraining concave grooves. Also, bent portions 51 longer than the width of the restraining holes 48 are formed in the upper end portions of the spring pins 49, 49 to thereby regulate the amount of entry of the spring pins 49, 49 into the restraining holes 48. With such spring pins 49, 49 pushed in the restraining holes 48, the curved portions 50 enter a part of the restraining concave grooves 46, 46 and at the same time, the upper and lower end portions of the spring pins 49, 49 resiliently press the inner sides of the restraining holes 48. As a result, the curved portions 50 will not come off the restraining concave grooves 46, 46 while remaining in the restraining concave grooves 46, 46.

In the case of the illustrated embodiment, the base end portion of a tilt lever 7a is pivotally supported on the outer end portions of the large-diametered portions 27a, 27a constituting the pivot pins 6b, 6b which protrude from the outer sides of the reinforcing plates 30a, 30a. By this tilt lever 7a being operated, it is made possible to position and fix the rear steering column 4b relative to the support bracket 5b and release the fixing thereof. However, a tilt mechanism comprising such a tilt lever 7a has no direct relation to the present invention and use can be made of conventional various mechanisms and therefore, such tilt mechanism need not be shown and described in detail.

In the case of the pivotally movable support apparatus for the tilt type steering apparatus of the present invention constructed as described above, the assembling work is easy and the higher efficiency of the work of manufacturing the tilt type steering apparatus can be achieved. That is, the work of supporting the rear steering column 4b on the support bracket 5b is accomplished by inserting the small-diametered portions 28a, 28a of-the pivot pins 6b, 6b into the small-diametered circular holes 42, 42 in the pivotally movable bracket 36, forcing the large-diametered portions 27a, 27a into the large-diametered circular holes 44, 44 in the support bracket 5b and further, inserting the spring pins 49 into the restraining holes 48. This work can be done easily without requiring particularly cumbersome work such as torque regulation or the mounting and dismounting of a receiving mold and any special tool.

Figure 4:
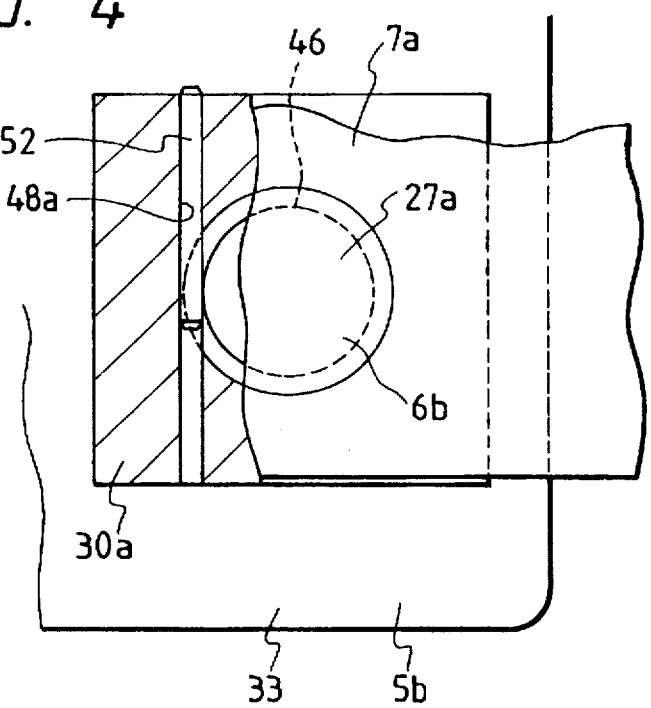
FIG. 4 is a view similar to FIG. 3 but showing a second embodiment of the present invention.
Figure 5:
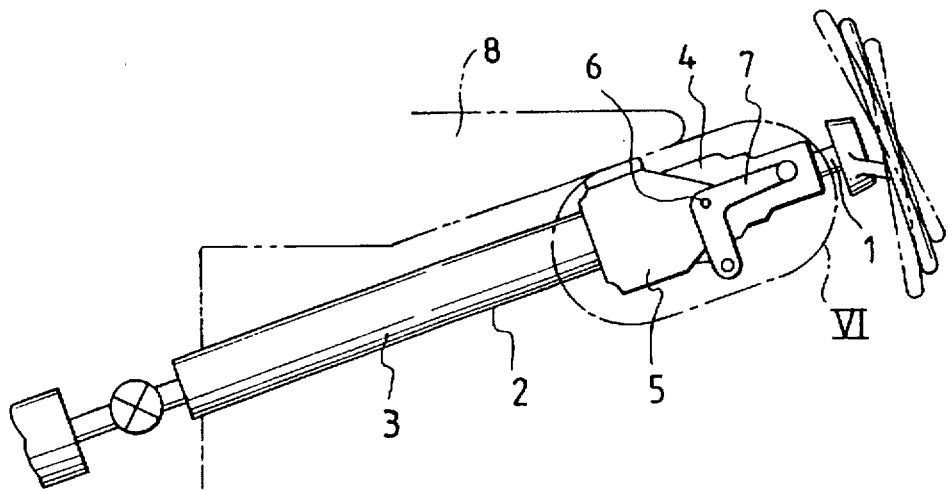
FIG. 5 is a side view showing a first example of the prior art tilt type steering apparatus.

FIG. 4 shows a second embodiment of the present invention. In the case of this embodiment, a restraining hole 48a is a circular hole and a pin 52 is forced into this restraining hole 48a from the upper end opening side thereof. The lower end portion of this pin 52 is brought into a portion of a restraining concave groove 46 formed in the large-diametered portion 27a of the pivot pin 6b. As the pin 52, use can be made of a pillar-like needle roller pin, besides a partly cut-away cylindrical spring pin. Again in the case of the present embodiment, the work of assembling the pivotally movable support apparatus for the tilt type steering apparatus is easy and the higher efficiency of the work of manufacturing the tilt type steering apparatus can be achieved.

The pivotally movable support apparatus for the tilt type steering apparatus of the present invention is constructed and acts as described above and therefore, by the heightened efficiency of the work of manufacturing the tilt type steering apparatus, it can contribute to a reduction in the costs of an automobile provided with the tilt type steering apparatus.

Figure 10:
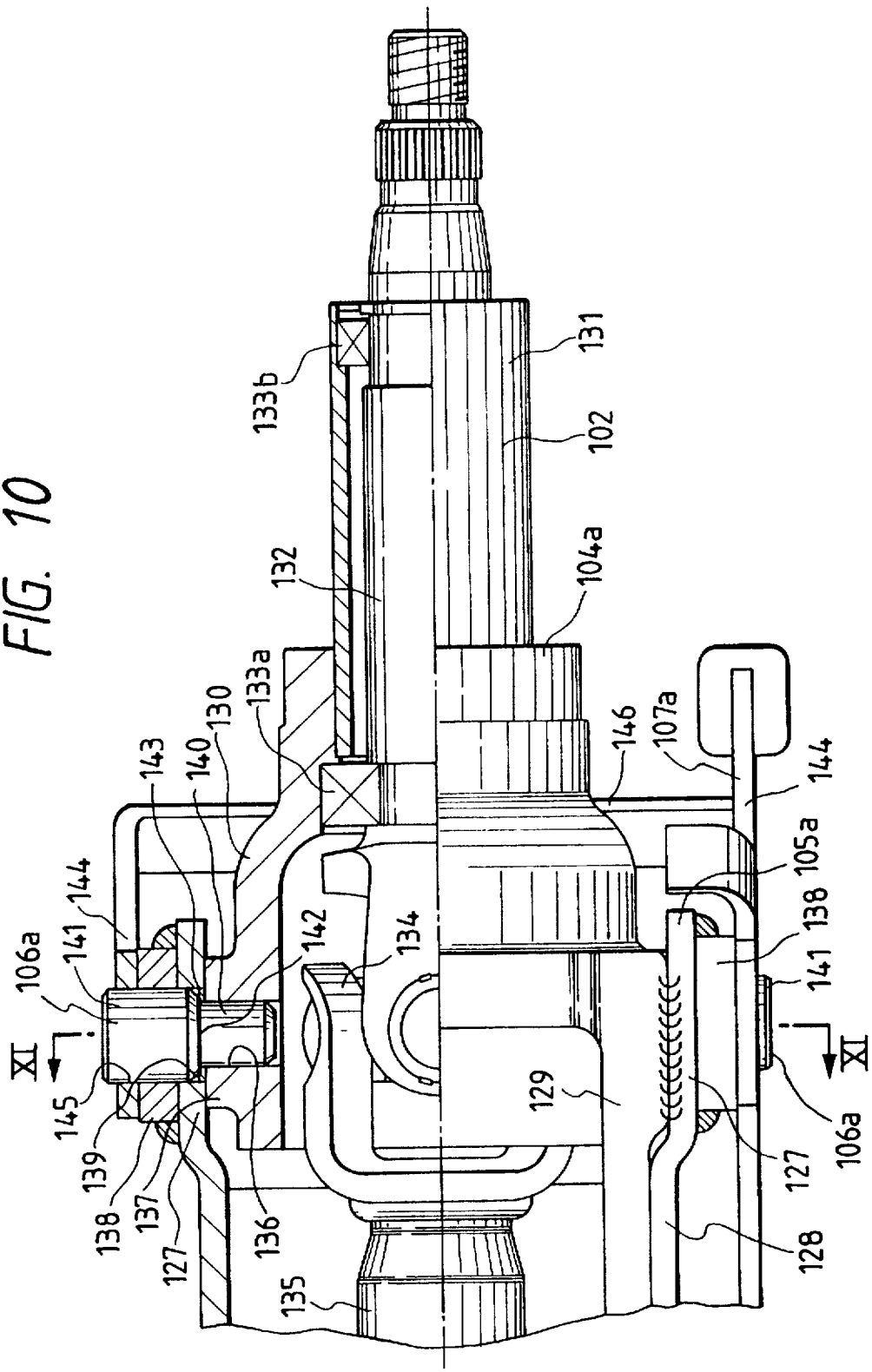
FIG. 10 is a half transverse cross-sectional view showing another embodiment of the present invention.
Figure 11:
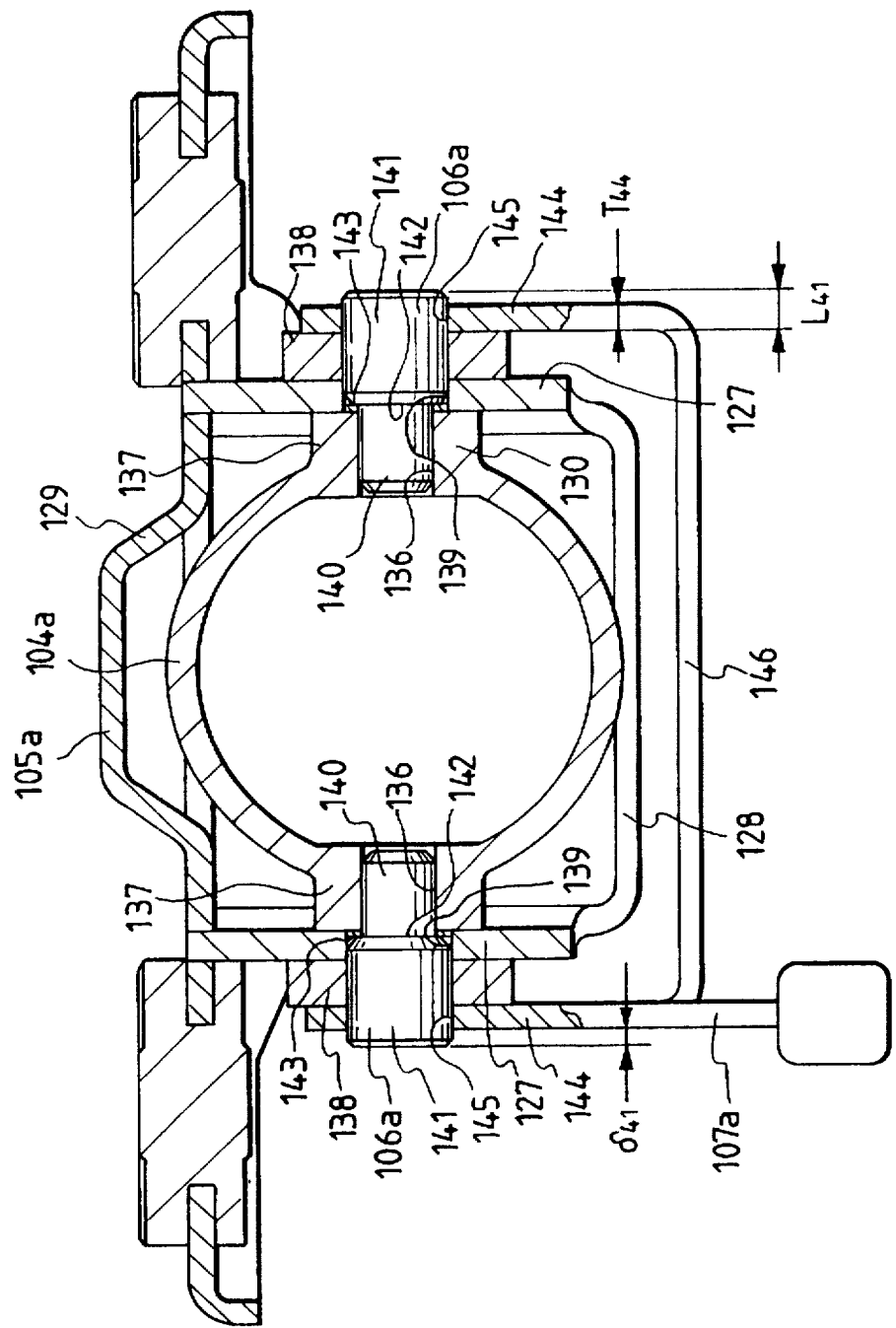
FIG. 11 is a cross-sectional view taken along the line XI—XI of FIG. 10 with some portions omitted.

FIGS. 10 and 11 show another embodiment of the present invention. On a support bracket 105a supported on and fixed to the vehicle body side, a pair of right and left vertical plate portions 127 and 127 are provided at an interval in parallelism to each other. In the case of the illustrated embodiment, the support bracket 105a comprises a U-shaped holding portion 128 formed by bending a sufficiently rigid steel plate, and a mounting plate portion 129 welded and fixed to the upper end edge of the holding portion 128. During the assembly of the tilt type steering apparatus, the mounting plate portion 129 is supported on the vehicle body by bolts, not shown. Inside the holding portion 128, the fore end portion (the left end portion as viewed in FIG. 10) of a rear steering column 104a constituting the rear portion of a steering column 102 is pivotably held by a pair of right and left pivot pins 106a and 106a disposed coaxially with each other. That is, this pair of pivot pins 106a and 106a are extended between the right and left sides of the fore end portion of the rear steering column 104a and the pair of vertical plate portions 127, 127.

The rear steering column 104a is comprised of a pivotally movable bracket 130 made by die-casting an aluminum alloy, and a column tube 131 having its fore end portion fitted and fixed to the pivotally movable bracket 130. Inside such a rear steering column 104a, a rear steering shaft 132 is supported for rotation only by a pair of fore and rear bearings 133a and 133b. The fore end portion of the rear steering shaft 132 is connected to the rear end portion (the right end portion as viewed in FIG. 10) of a fore steering shaft 135 through a universal joint 134. The center of displacement of the universal joint 134 lies on the extension of the center line of the pair of pivot pins 106a and 106a.

In order to pivotally support the fore end portion of the rear steering column 104a constructed as described above and supporting the rear steering shaft 132, by the pair of pivot pins 106a and 106a, a pair of small-diametered circular holes 136 and 136 coaxial with each other are formed in the right and left sides of the fore end portion of the rear steering column 104a. That is, thick portions 137, 137 are formed on the right and left sides of the fore end portion of the pivotally movable bracket 130, and the small-diametered circular holes 136, 136 are formed in the respective thick portions 137, 137 coaxially with each other. These small-diametered circular holes 136, 136 are formed through the thick portions 137, 137, and the outer end portions of the small-diametered circular holes 136, 136 open into the right and left sides of the fore end portion of the pivotally movable bracket 130.

On the other hand, reinforcing plates 138, 138 are welded and fixed to the right and left sides of the rear end portion of the vertical plate portions 127, 127. A pair of large-diametered circular holes 139, 139 are formed through the inner sides of the vertical plate portions 127, 127 to the outer sides of the reinforcing plates 138, 138.

Also, the pair of pivot pins 106a, 106a comprise small-diametered portions 140, 140 and large-diametered portions 141, 141 connected together by stepped portions 142, 142. Such pivot pins 106a, 106a are integrally made, for example, by pre-cutting stainless steel, an aluminum alloy or the like, die-casting an aluminum alloy or injection molding of synthetic resin. With the large-diametered portions 141, 141 forced into the large-diametered circular holes 139, 139, the small-diametered portions 140, 140 are inserted in the small-diametered circular holes 136, 136 for relative rotation. Spacers 143, 143 formed into a circular ring-like shape by a slippery material such as synthetic resin are held between the stepped portions 142, 142 and the outer sides of the thick portions 137, 137. These spacers 143, 143 serve to mitigate friction acting between the stepped portions 142, 142 which are not displaced even during the tilting operation and the outer sides of the thick portions 137, 137 which are displaced during the tilting operation.

Further, the outer end portions of the large-diametered portions 141, 141 are protruded from the outer sides of the reinforcing plates 138, 138. The amount of protrusion $L_{41}$ of the large-diametered portions 141, 141 from the outer sides of the reinforcing plates 138, 138 is equal to or greater than the thickness $T_{44}$ of pivotally movable arm portions 144, 144 constituting a tilt lever 107a which will be described below ($L_{41} \geq T_{44}$).

The tilt lever 107a for accomplishing the positioning and fixing of the rear steering column 104a relative to the support bracket 105a and the release thereof is formed by bending a sufficiently rigid metallic plate such as a steel plate or a stainless steel plate. This tilt lever 107a is provided with a pair of pivotally movable arm portions 144, 144 parallel to each other, a pair of circular holes 145, 145 formed in the tip end portions of these pivotally movable arm portions 144, 144, and a connecting plate portion 146 connecting the base end portions of the pivotally movable arm portions 144, 144 together.

Such a tilt lever 107a is pivotally supported on the support bracket 105a by the circular holes 145, 145 being fitted onto the outer end portions of the large-diametered portions 141, 141 constituting the pivot pins 106a, 106a. This fitting work is carried out by any one of the following methods (1) and (2).

(1) With the small-diametered circular holes 136, 136, the large-diametered circular holes 139, 139 and the circular holes 145, 145 disposed coaxially with one another, the pivot pins 106a, 106a are inserted from outside the circular holes 145, 145 into the holes 136, 136. The large-diametered portions 141, 141 of the pivot pins 106a, 106a are then forced into the large-diametered circular holes 139, 139.

(2) The large-diametered portions 141, 141 of the pivot pins 106a, 106a are forced into the large-diametered circular holes 139, 139 in advance, and with the spacing between the tip end portions of the pair of pivotally movable arm portions 144, 144 resiliently widened, the circular holes 145, 145 are fitted onto the outer end portions of the large-diametered portions 141, 141.

By which of the foregoing methods the fitting work should be done may be suitably selected, but by whichever method the fitting work has been done, the outer end portions of the large-diametered portions 141, 141 protrude by $\delta_{41}$ ($\geq 0$) from the outer sides of the pivotally movable arm portions 144, 144. Therefore, the engagement between the outer end portions of the large-diametered portions 141, 141 and the circular holes 145, 145 takes place reliably, and irrespective of the pivotal movement of the tilt lever 107a, this engagement will not be inadvertently released. Also, the above-mentioned amount of protrusion $\delta_{41}$ will suffice if it is of such a degree that the engagement is not inadvertently released, and need not be so great and thus, the maximum width of the mounted portion of the tilt lever 107a does not increase.

Figure 6:
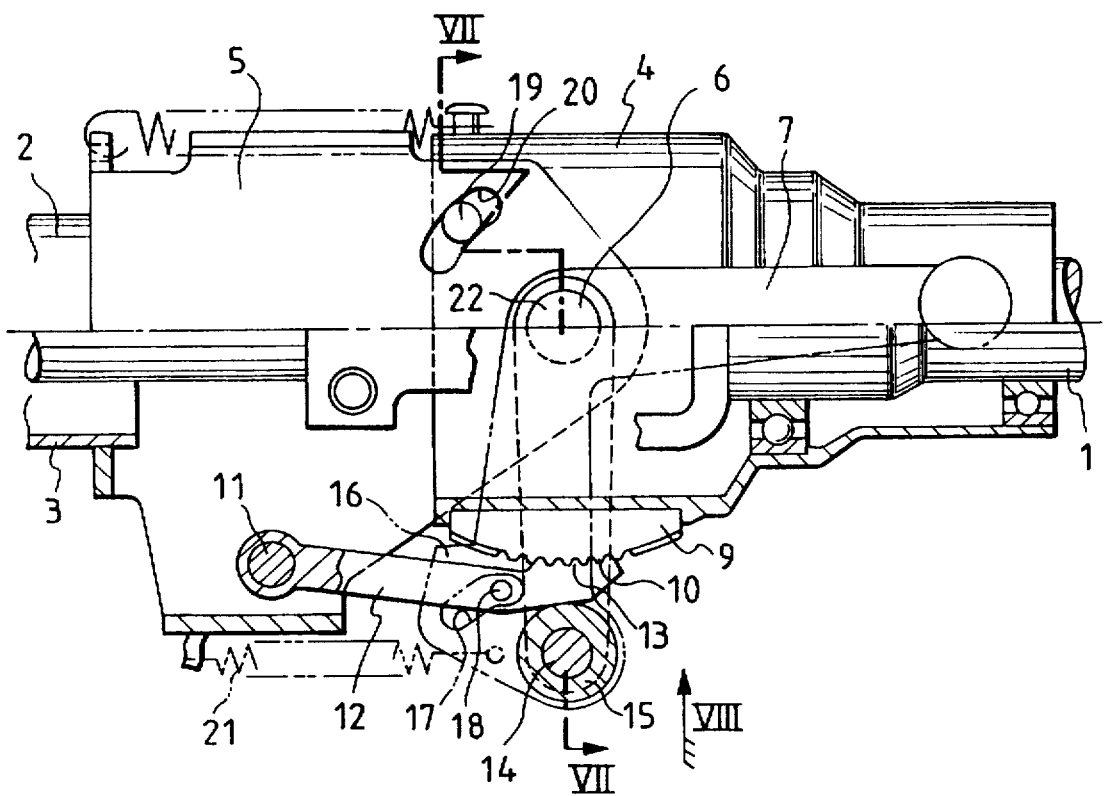
FIG. 6 is an enlarged cross-sectional view of the portion VI of FIG. 5.
Figure 7:
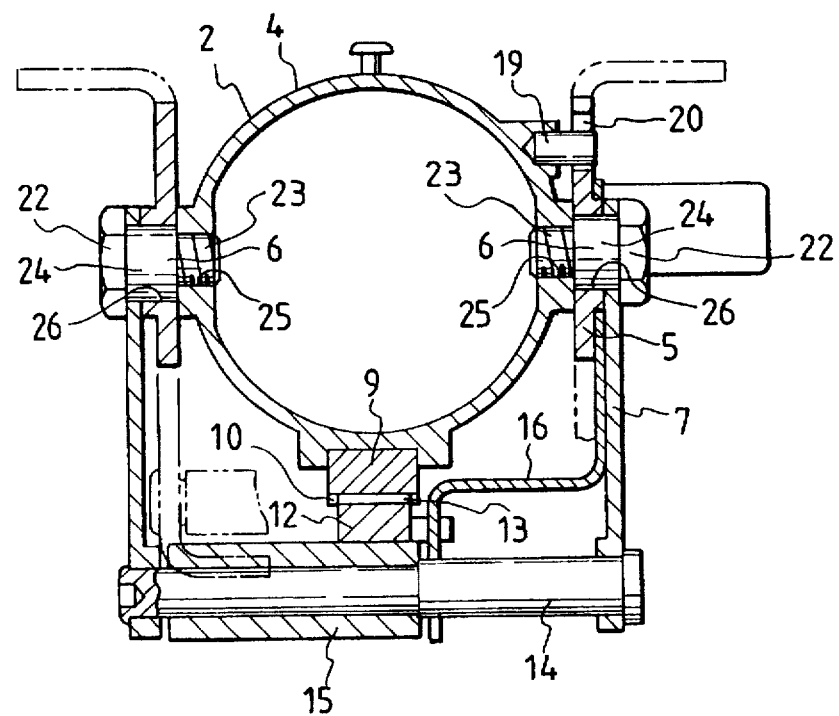
FIG. 7 is a cross-sectional view taken along the line VII—VII of FIG. 6.
Figure 8:
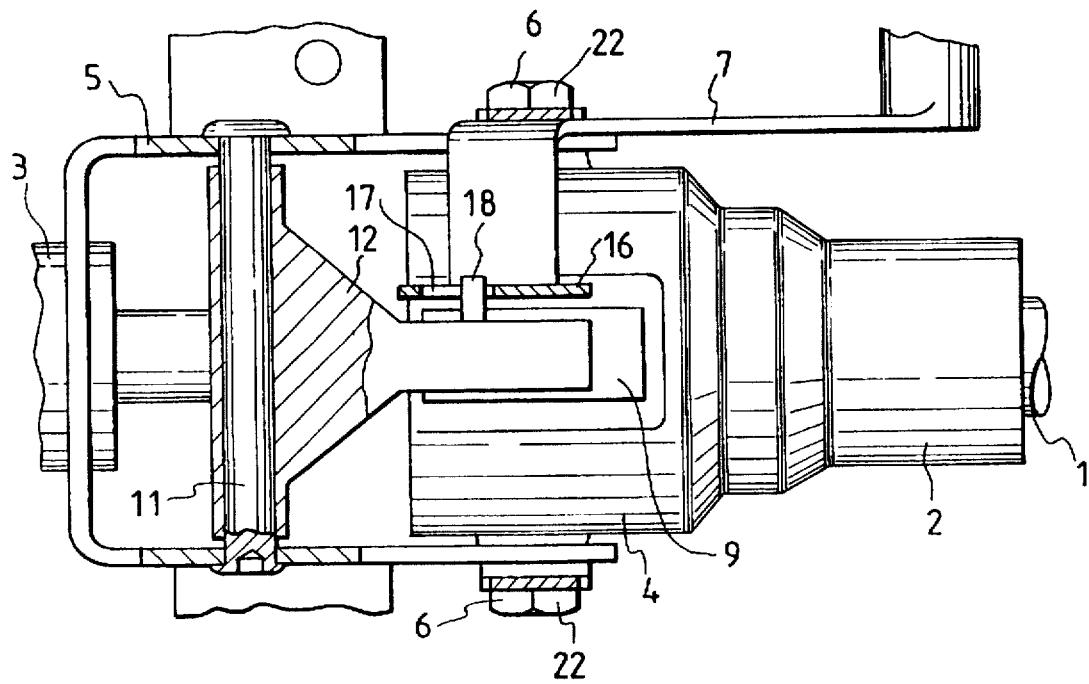
FIG. 8 is a view, partly in cross-section, taken along the arrow VIII of FIG. 6.
Figure 9:
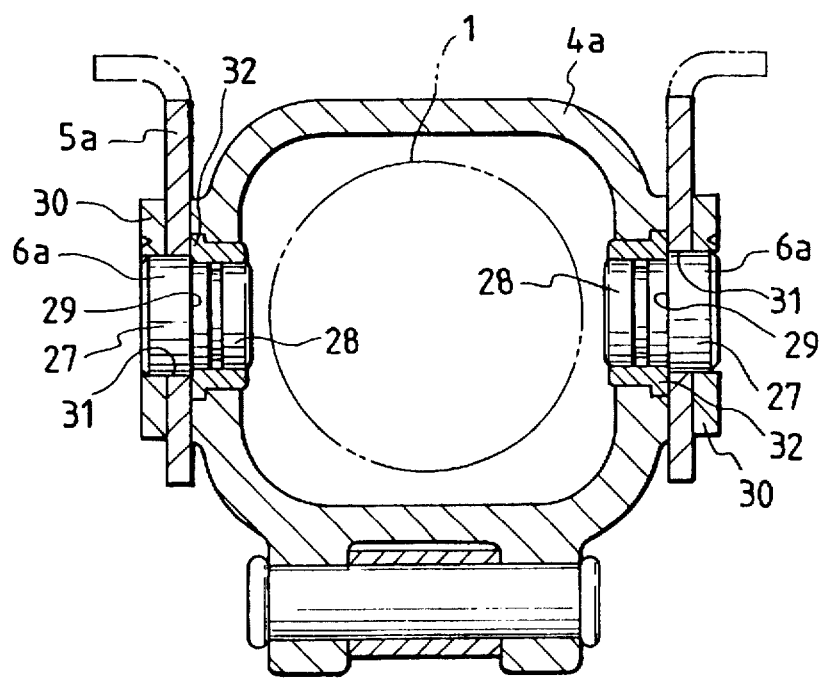
FIG. 9 is a view similar to FIG. 7 but showing a second example of the tilt type steering apparatus of the prior-art structure.

The restraining mechanism engaged and disengaged by the tilt lever 107a as described above has no direct relation to the present invention, and use can be made of various conventional mechanisms, including the mechanism shown in FIGS. 6 to 8, and therefore the restraining mechanism need not be shown and described in detail.

In the case of the tilt type steering apparatus of the present invention constructed as described above, the assembling work is easy and the high efficiency of the work of manufacturing the tilt type steering apparatus can be achieved. That is, the work of pivotally supporting the tilt lever 107a on the support bracket 105a can be done easily without requiring any particularly cumbersome work such as torque regulation or the mounting and dismounting of a receiving mold or any special tool.

The tilt type steering apparatus of the present invention, which is constructed and acts as described above, can contribute to a reduction in the costs of an automobile provided with the tilt type steering apparatus, by the heightening of the efficiency of the work of manufacturing the tilt type steering apparatus. Also, the maximum width dimension is made small and the installation of the apparatus in a narrow space becomes possible and therefore, design becomes easy.

FIGS. 12 to 15 show still another embodiment of the present invention. A feature of this embodiment resides in the structure of a portion in which to support the weight of a rear steering column 204a, a compression coil spring 226 is disposed between the rear side (the right side as viewed in FIGS. 12, 14 and 15) of a fixed side receiving piece 227 secured to a support bracket 205 and the fore side (the left side as viewed in FIGS. 12, 14 and 15) of a pivotally movable side receiving piece 230 secured to a pivotally movable bracket 229. In the other points, the construction and action of the present embodiment are similar to those of the prior art shown in FIGS. 5 to 8 or FIGS. 16 to 19 and therefore, overlapping description will be omitted or simplified and chiefly the characteristic portions of the present embodiment will hereinafter be described.

Figure 12:
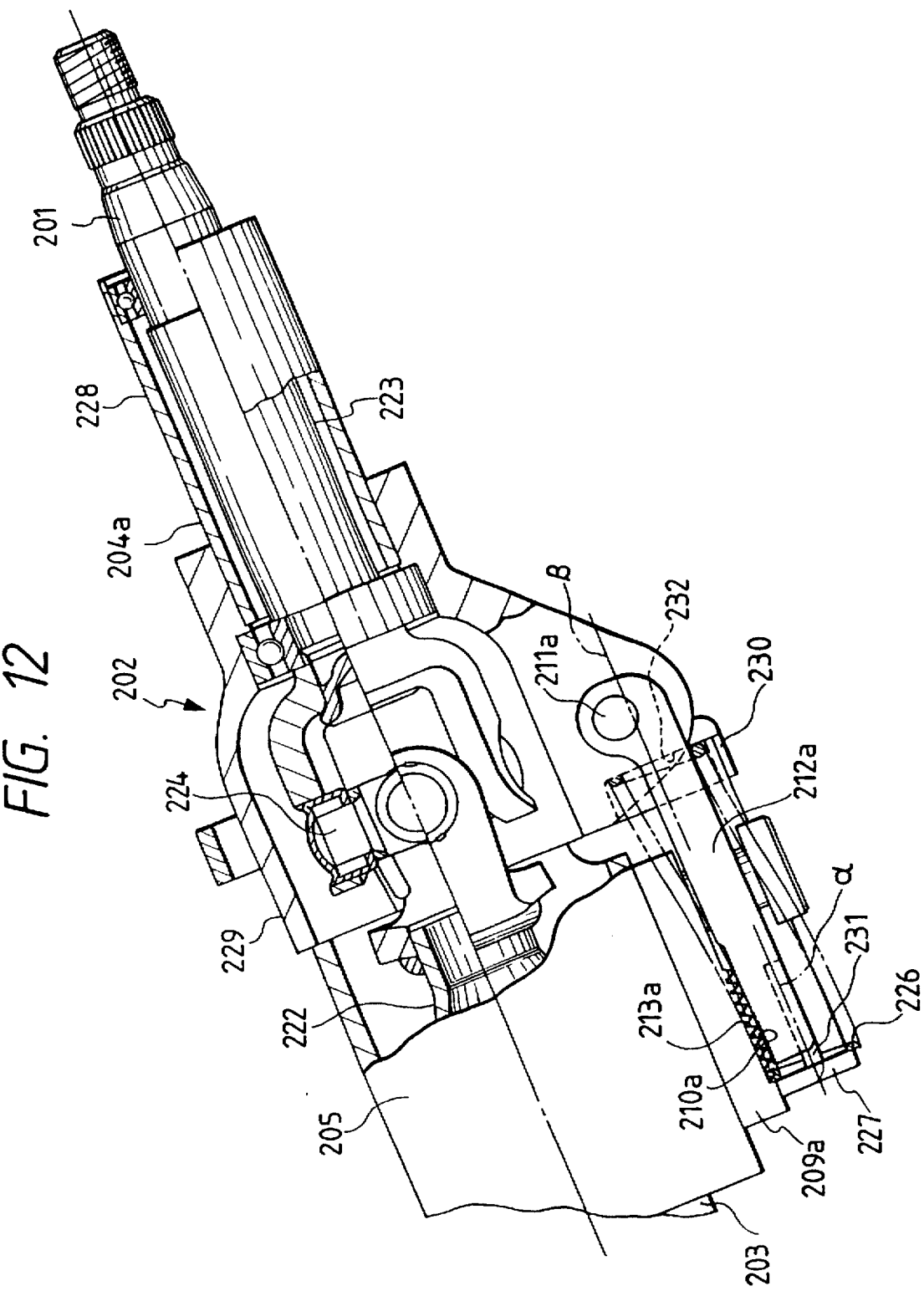
FIG. 12 is a longitudinal cross-sectional view showing the primary portions of still another embodiment of the present invention.
Figure 13:
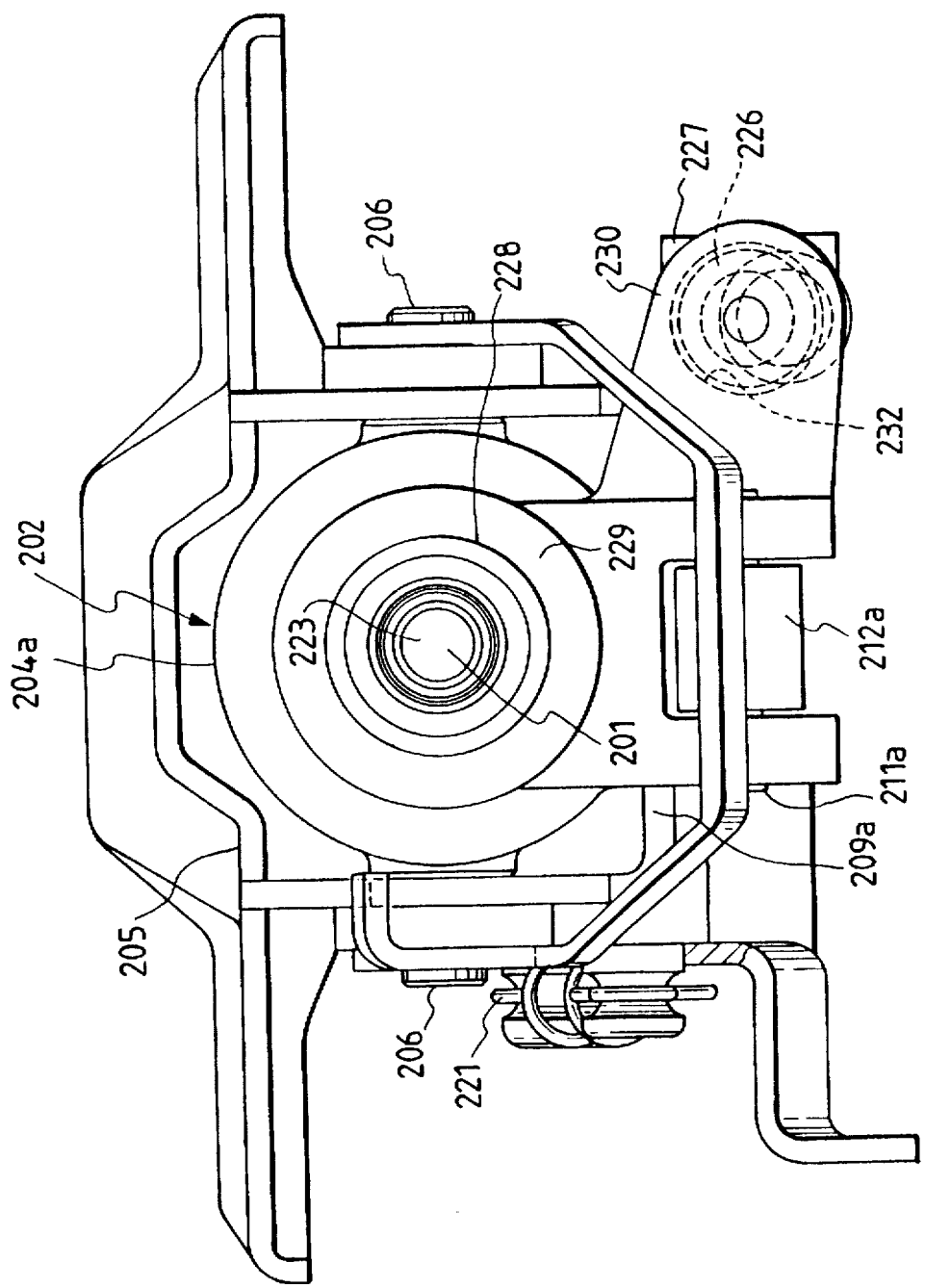
FIG. 13 is a view of the FIG. 12 embodiment as it is seen in the axial direction rightwardly from above it.
Figure 14:
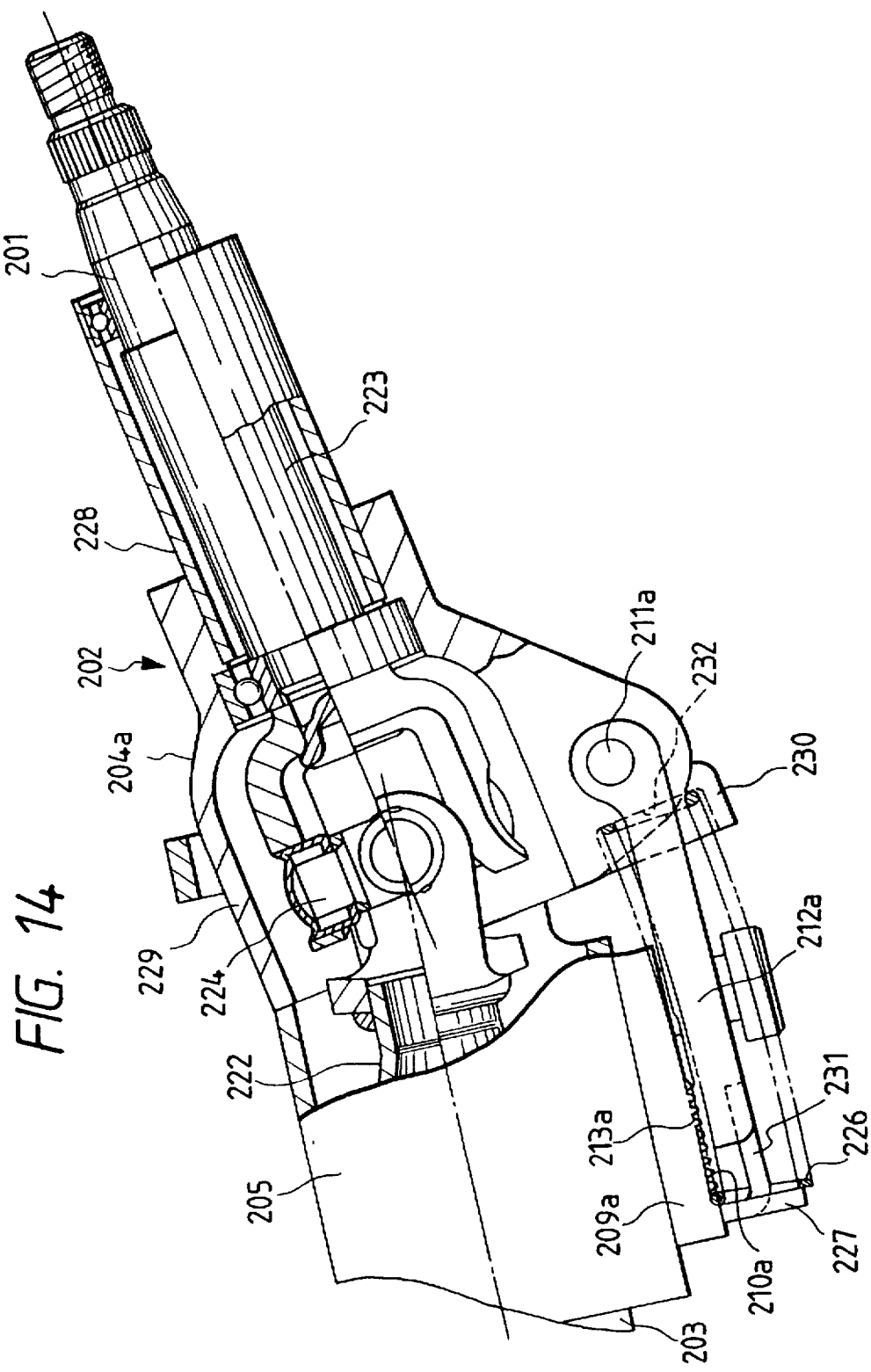
FIG. 14 is a view similar to FIG. 12 but showing a state in which a rear steering column has been pivotally displaced to its uppermost position.
Figure 15:
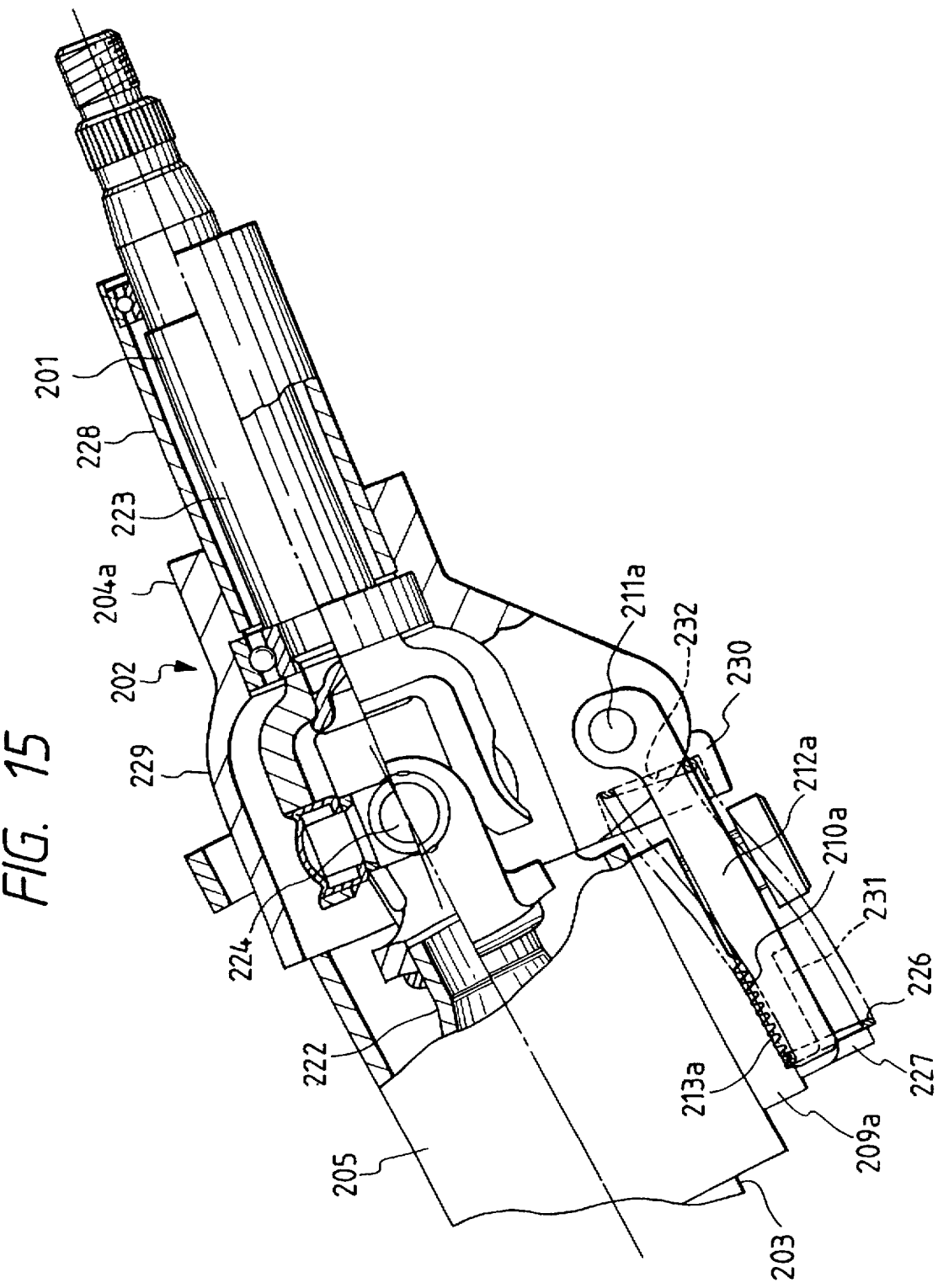
FIG. 15 is a view similar to FIG. 12 but showing a state in which the rear steering column has been pivotally displaced to its lowermost position.
Figure 16:
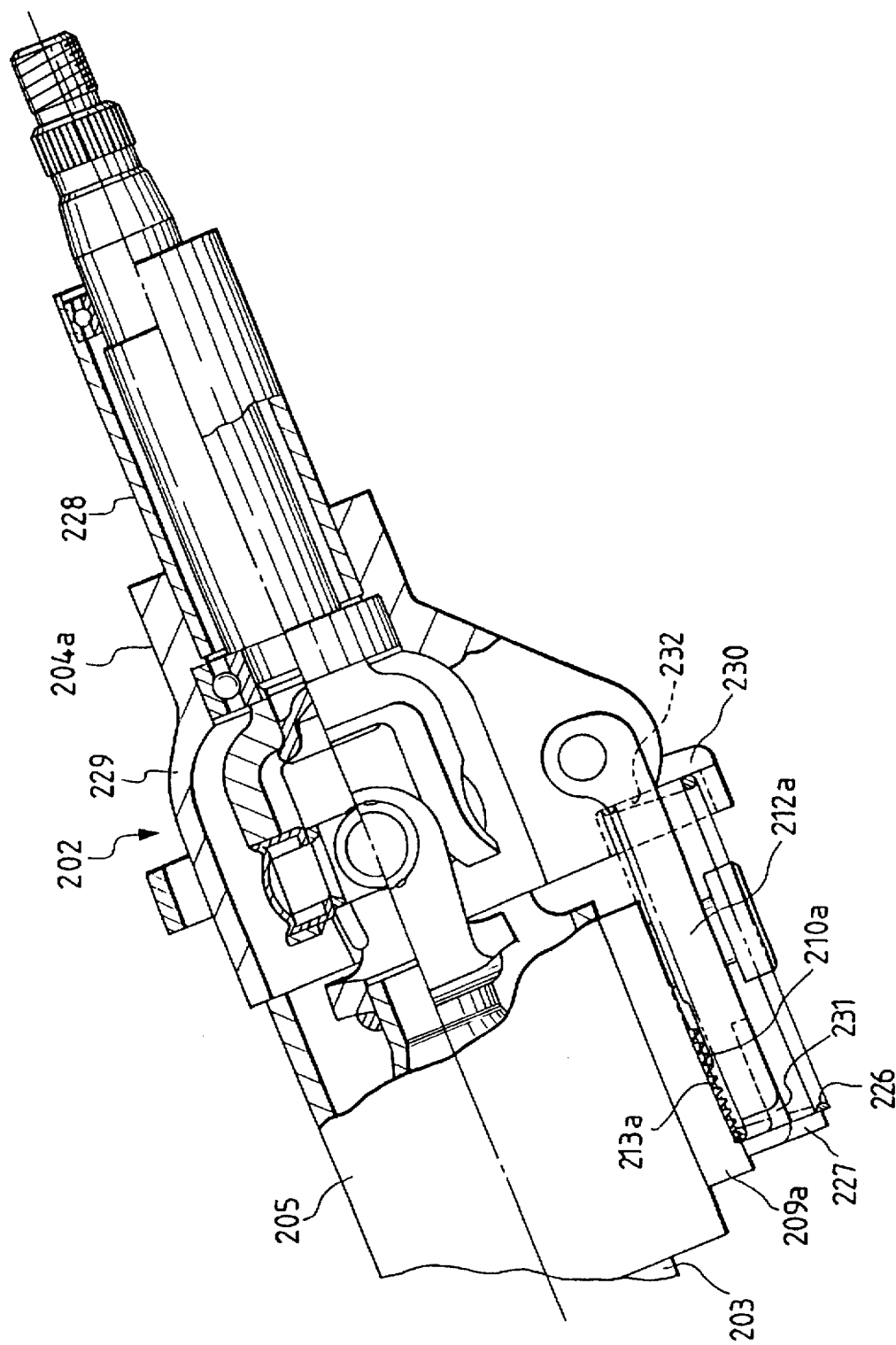
FIG. 16 is a longitudinal cross-sectional side view showing the essential portions of the prior-art structure incorporating a compression coil spring therein.
Figure 17:
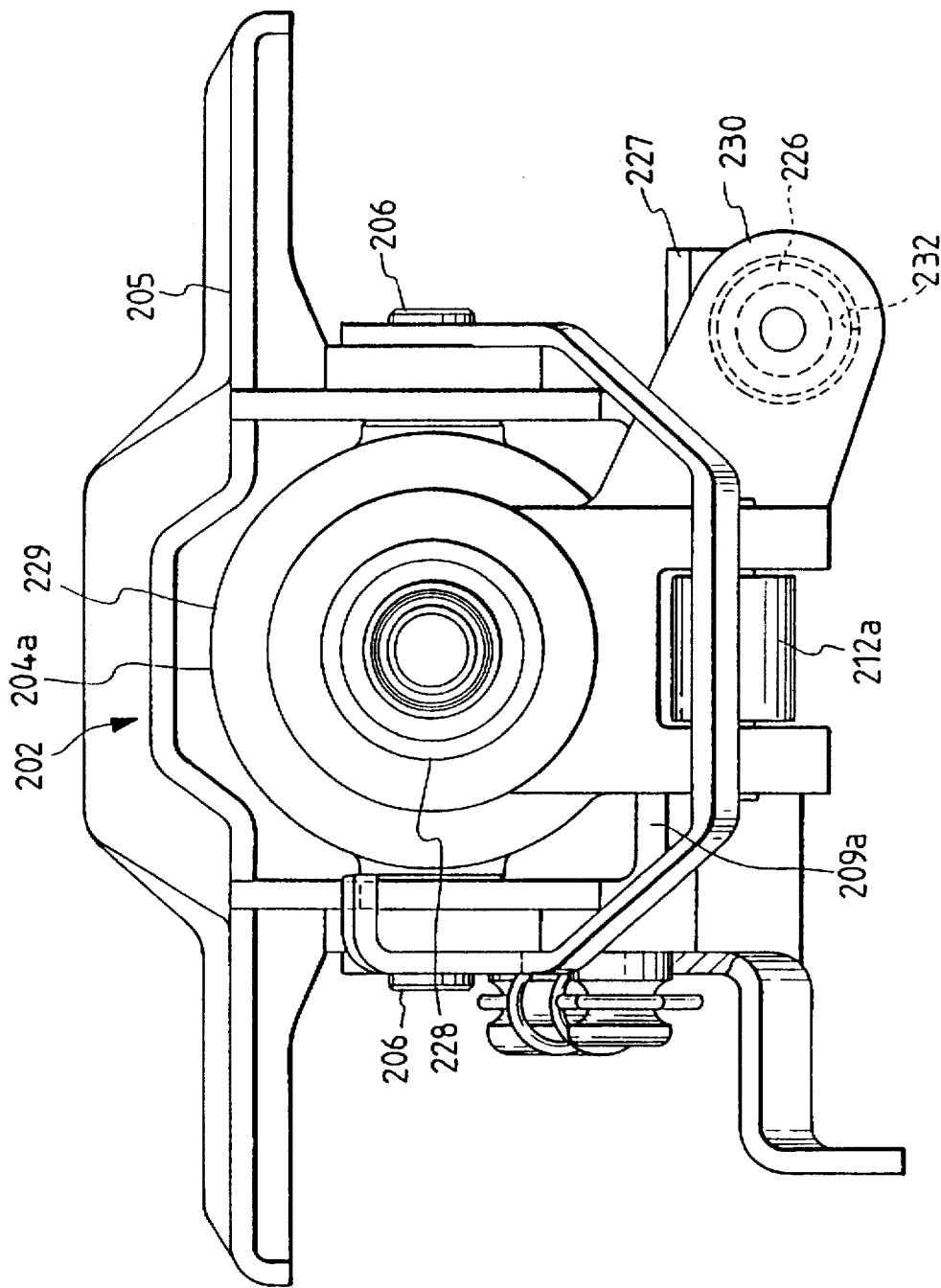
FIG. 17 is a view of the FIG. 16 structure as it is seen in the axial direction rightwardly from above it.
Figure 18:
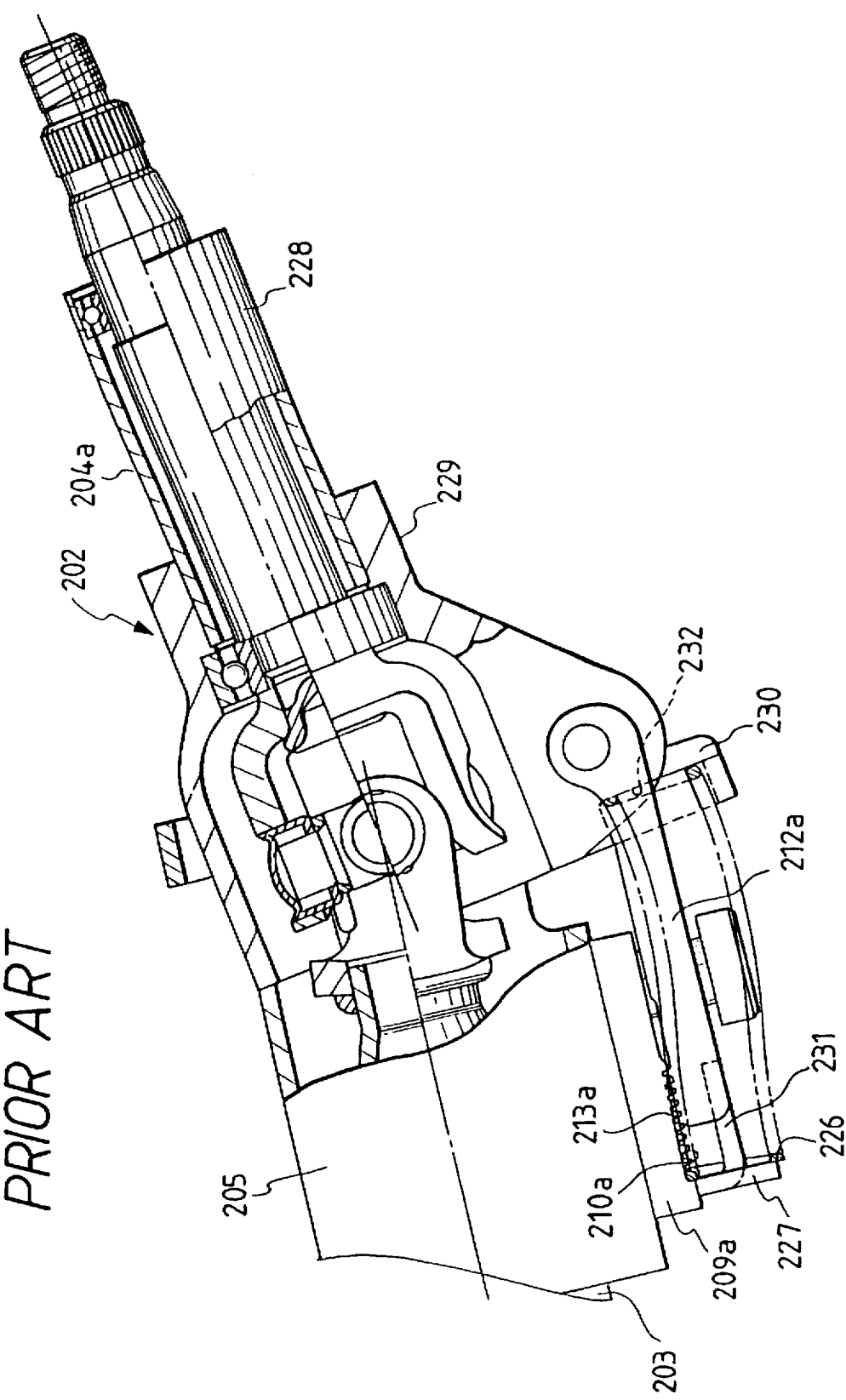
FIG. 18 is a view similar to FIG. 16 but showing a state in which a rear steering column has been pivotally displaced to its uppermost position.
Figure 19:
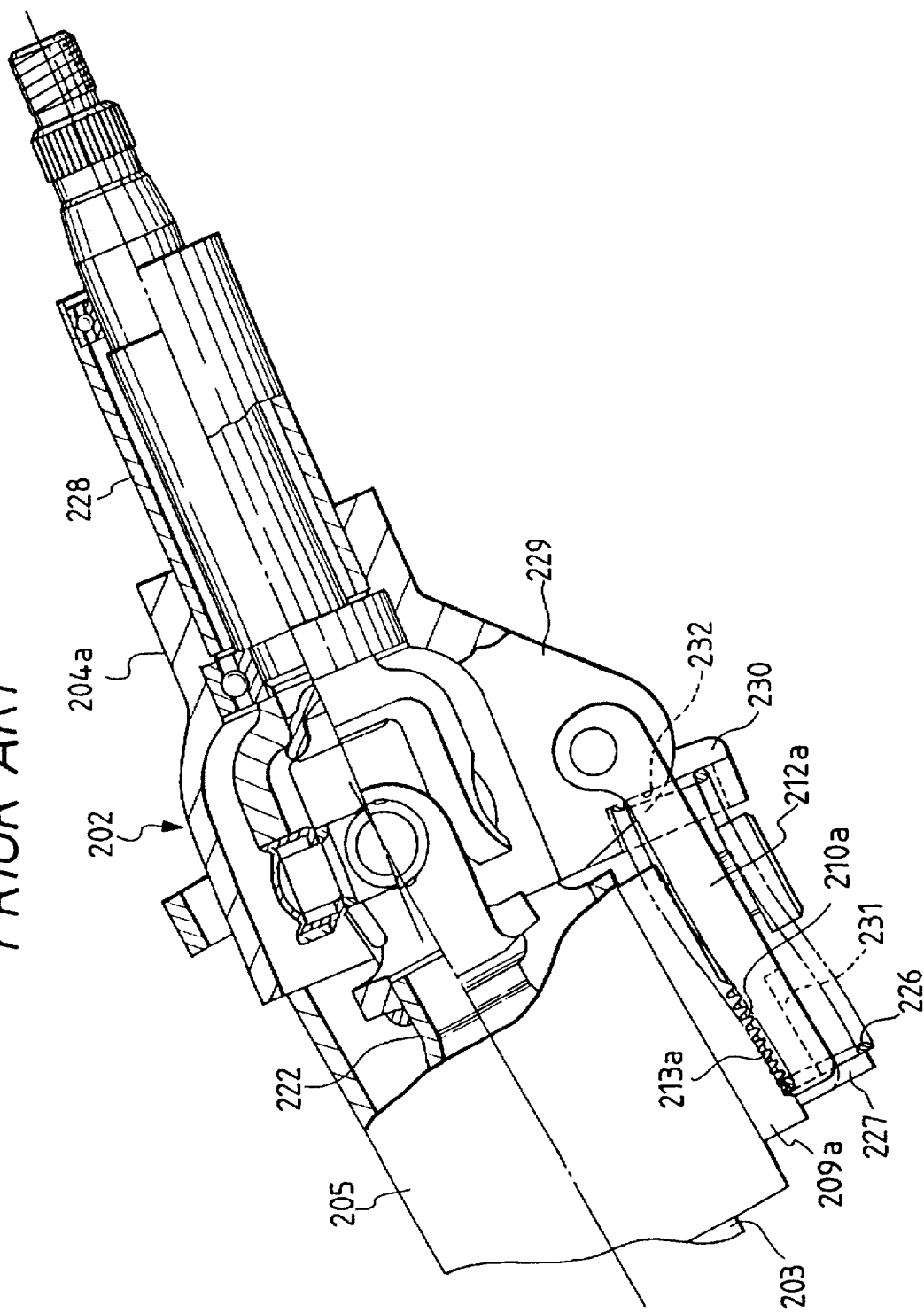
FIG. 19 is a view similar to FIG. 16 but showing a state in which the rear steering column has been pivotally displaced to its lowermost position.

A bent-up piece 231 is bent up on the rear side of the fixed side receiving piece 227 perpendicularly to this rear side, and the fore end portion (the left lower end portion as viewed in FIGS. 12, 14 and 15) of the compression coil spring 226 is fitted on the bent-up piece 231. Also, a circular concave hole 232 is formed in the fore side of the pivotally movable side receiving piece 230 in a direction perpendicular to this fore side, and the rear end portion (the right upper end portion as viewed in FIGS. 12, 14 and 15) of the compression coil spring 226 is fitted in the concave hole 232. In the case of the tilt type steering apparatus of the present embodiment, unlike the aforedescribed prior-art structure, the center axis α of the bent-up piece 231 and the center axis β of the concave hole 232 do not coincide with each other. In the case of the illustrated embodiment, when as shown in FIG. 12, the rear steering column 204a is brought into its neutral position, the center axes α and β become parallel to each other, but the center axis β of the concave hole 232 exists in a portion nearer to a steering shaft 201 than the center axis α of the bent-up piece 231.

Accordingly, even when the rear steering column 204a is in its neutral position, the compression coil spring 226 does not become straight. In the case of the illustrated embodiment, more specifically, the underside becomes convexly curved except the vicinity of the rear end portion fitted in the concave hole 232. Even if in order to elevate a steering wheel from this state, the rear steering column 204a is counter-clockwisely pivotally moved to a position shown in FIG. 14, the compression coil spring 226 will have its underside kept convexly curved. With the rear steering column 204a thus pivotally moved to the position shown in FIG. 14 to elevate the steering wheel, the rear end portion of the compression coil spring 226 becomes substantially straight. Further, even if in order to lower the steering wheel from the neutral position, the rear steering column 204a is clockwisely pivotally moved to a position shown in FIG. 15, the compression coil spring 226 will have its underside kept convexly curved except the vicinity of the rear end portion fitted in the concave hole 232.

Thus, in the tilt type steering apparatus of the present embodiment, the entire compression coil spring 226 does not momentarily change its direction of curve. Therefore, even if a member for the prevention of vibration is not particularly provided, it will never happen that the compression coil spring 226 produces unusual sound which will give an unpleasant feeling to the crew. In the illustrated embodiment, the rear end portion of the compression coil spring 226 is positioned near the steering shaft 201, as compared with the fore end portion thereof, but alternatively, the directions of displacement of these end portions may be converse to those in the case shown.

The present embodiment is constructed and acts as described above and therefore, there can be inexpensively obtained a structure which does not give an unpleasant feeling to the crew.

Figure 20:
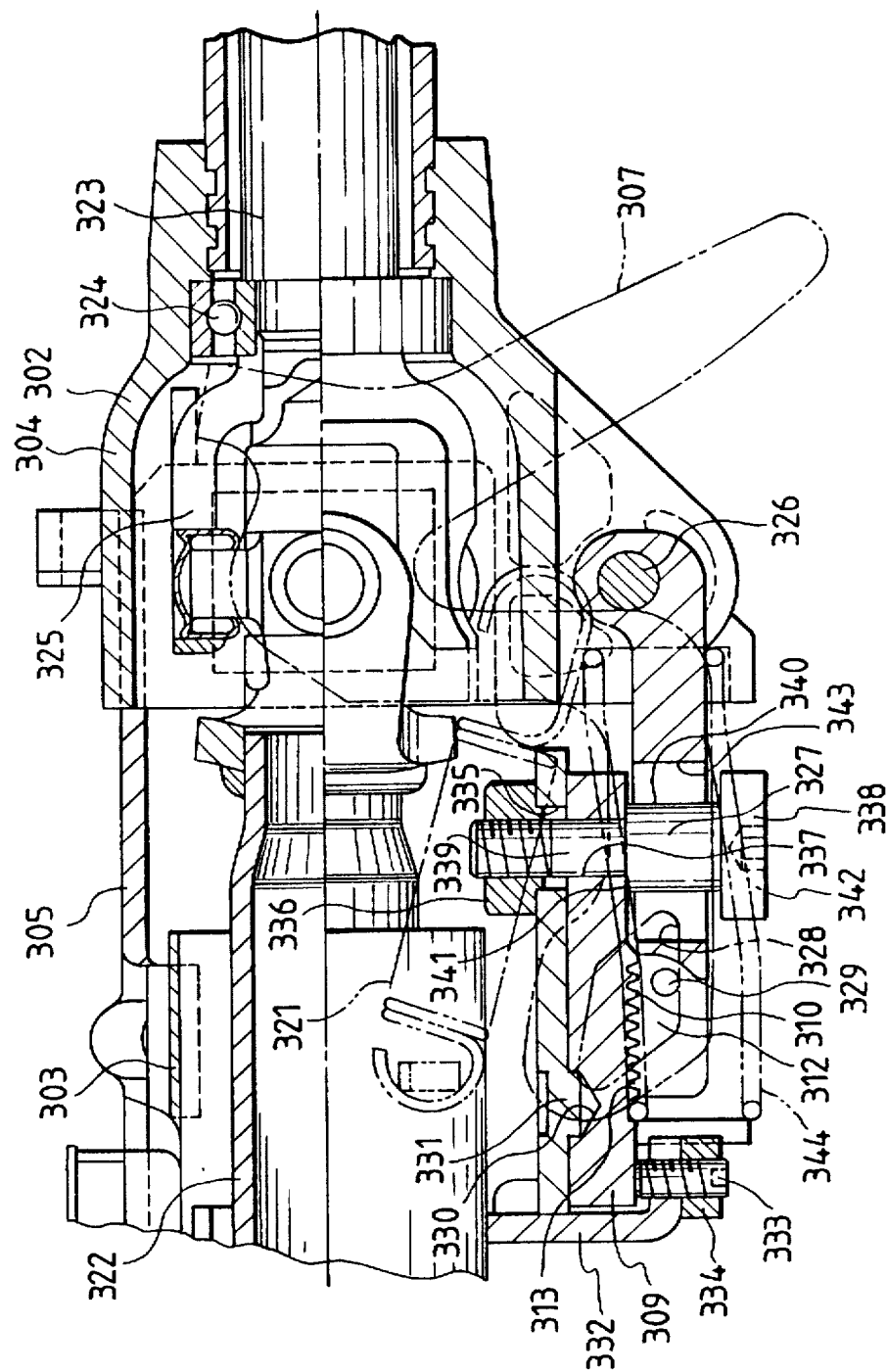
FIG. 20 is a longitudinal cross-sectional side view showing the primary portions of yet still another embodiment of the present invention.
Figure 21:
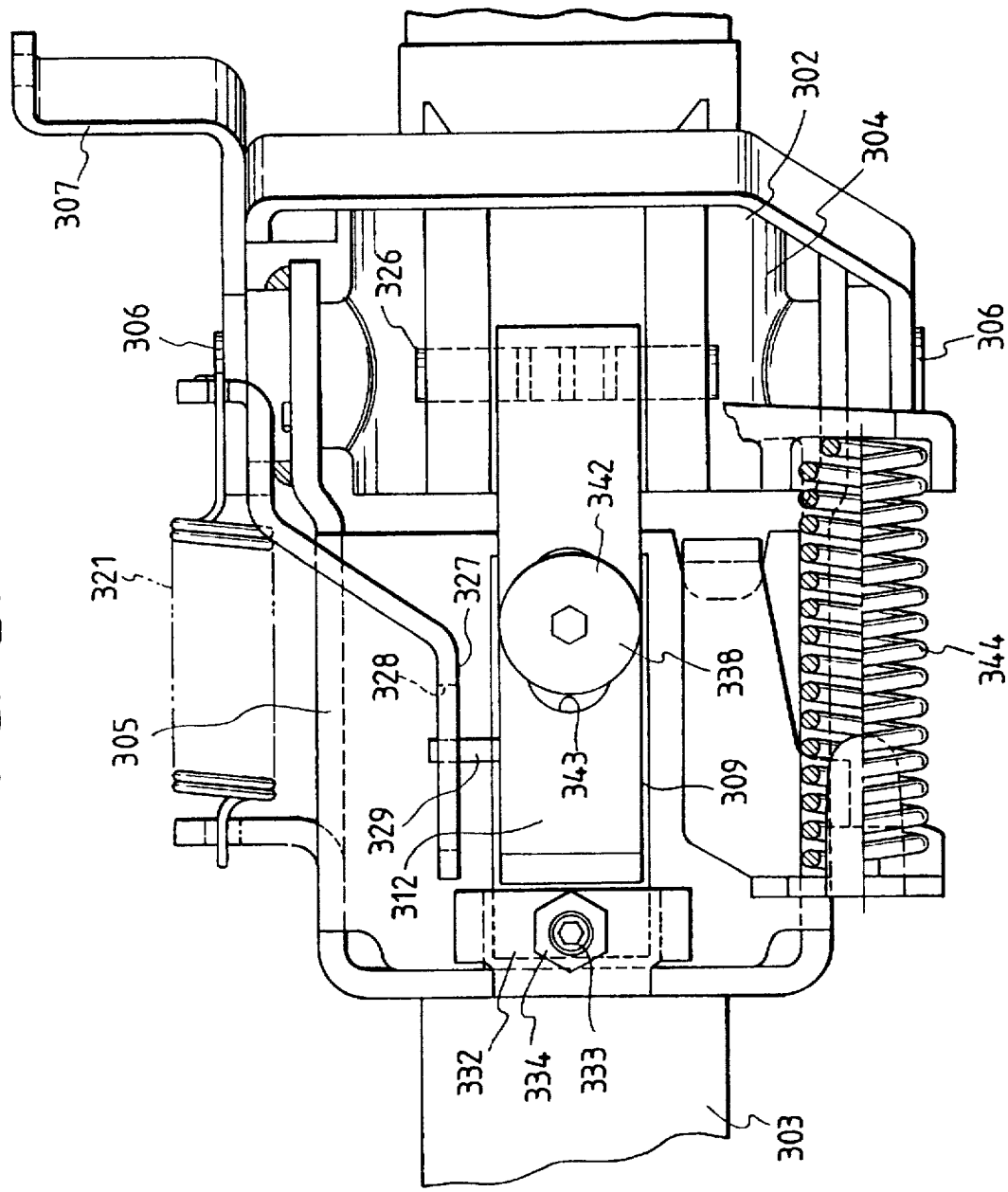
FIG. 21 is a view of the FIG. 20 embodiment as it is seen from below it.

FIGS. 20 and 21 show still another embodiment of the present invention. A fore steering shaft 322 is supported for rotation only inside a fore steering column 303. The rear end portion (the right end portion as viewed in FIGS. 20 and 21) of the fore steering column 303 is supported on and fixed to a support bracket 305 made as by press-molding a metallic plate. This support bracket 305 is fixed to a vehicle body under a dashboard 308 (e.g. see FIG. 5 at 8). The fore end of a rear steering column 304 is pivotally supported on the rear end portion of the support bracket 305 by lateral shafts 306, 306 which are first lateral shafts.

For this purpose, circular holes are formed in the right and left sides of the fore end portion (the left-end portion as viewed in FIGS. 20 and 21) of the rear steering column 304 made as by die-casting an aluminum alloy, and the inner halves of the lateral shafts 306, 306 are inserted in the circular holes. Accordingly, the rear steering column 304 is supported for pivotal movement about the lateral shafts 306, 306 relative to the support bracket 305.

Inside the rear steering column 304 thus supported, a rear steering shaft 323 is supported for rotation only by a pair of fore and rear deep groove type ball bearings 324. The fore end portion (the left end portion as viewed in FIG. 20) of the rear steering shaft 323 and the rear end portion (the right end portion as viewed in FIG. 20) of the fore steering shaft 322 are connected together by a universal joint 325. In the case of the illustrated embodiment, the center of displacement of this universal joint 325 is disposed on the extension of the pair of lateral shafts 306 and 306. Accordingly, even when the rear steering column 304 is pivotally moved about the lateral shafts 306, 306, the transmission of rotational force between the fore steering shaft 322 and the rear steering shaft 323 is effected smoothly.

Also, a second lateral shaft 326 is provided under the fore end portion of the rear steering column 304, and the rear end portion (the right end portion as viewed in FIGS. 20 and 21) of an engagement member 312 is pivotally supported on the second lateral shaft 326. Rack-like (flat gear-like) displacement side meshing teeth 313 are formed on the upper surface of the fore end portion (the left end portion as viewed in FIGS. 20 and 21) of the engagement member 312. On the other hand, a restraining member 309 is fixed to that portion of the underside of the support bracket 305 which is opposed to the displacement side meshing teeth 313 and rack-like fixed side meshing teeth 310 are formed on the underside of the restraining member 309.

The displacement side meshing teeth 313 and the fixed side meshing teeth 310 are releasably engageable with each other on the basis of the pivotal movement of a tilt lever 307. This tilt lever 307 is pivotable about the lateral shaft 306 and is pivotally supported on the support bracket 305. A forwardly extending arm portion 327 is provided on a portion of the tilt lever 307, and a substantially lozenge-shaped through-hole 328 is formed in the fore end portion of this arm portion 327. A pin 329 projectedly provided on a side of the forward end portion of the engagement member 312 is loosely fitted in the through-hole 328. Accordingly, in a state in which the tilt lever 307 has been pivotally moved clockwisely as viewed in FIG. 20 and the lower edge of the through-hole 328 bears against the underside of the pin 329, the fore end portion of the engagement member 312 is pushed upwardly and the displacement side meshing teeth 313 come into meshing engagement with the fixed side meshing teeth 310. Conversely, in a state in which the tilt lever 307 has been pivotally moved counter-clockwisely as viewed in FIG. 20 and the upper edge of the through-hole 328 bears against the upper surface of the pin 329, the fore end portion of the engagement member 312 and the engagement between the displacement side meshing teeth 313 and the fixed side meshing teeth 310 is released.

In the case of the tilt type steering apparatus of the present invention, in order to reliably bring the displacement side meshing teeth 313 into meshing engagement with the fixed side meshing teeth 310 with the tilt lever 307 pivotally moved clockwisely as viewed in FIG. 20, the restraining member 309 is supported on and fixed to the underside of the support bracket 305 which is the other member, for free adjustment of the angle of inclination of the fixed side meshing teeth 310 with respect to the direction of tooth trace thereof. That is, a circular concave hole 330 is formed in the upper surface of the fore end portion (one end portion) of the restraining member 309 and a circular convex portion 331 is formed on the underside of the fore end portion of the support bracket 305, and the concave hole 330 and the convex portion 331 are brought into engagement with each other. Accordingly, the fore end portion of the restraining member 309 is restrained on the support bracket 305 for pivotal movement with respect to the direction of tooth trace of the fixed side meshing teeth 310. A stud 333 is threadably engaged with a threaded hole formed in an L-shaped keep plate portion 332 formed on the fore end edge of the support bracket 305, and the upper end surface of this stud 333 is rammed against the underside of the fore end portion of the restraining member 309 to thereby prevent this restraining member 309 from floating up from the underside of the support bracket 305. Also, a lock nut 334 is threadably engaged with the stud 333 to thereby prevent the loosening of this stud 333.

On the other hand, a nut 336 is fitted and fixed to the upper end opening portion of a circular hole 335 formed in the rear end portion of the support bracket 305. Also a through-hole 337 is formed at a location in the rear end portion (the other end portion) of the restraining member 309 which is aligned with the circular hole 335. A fixing bolt 338 is inserted into the through-hole 337 from below to above the restraining member 309. This fixing bolt 338 comprises a small-diametered portion 339 and a large-diametered portion 340 connected together by a stepped portion 341, and an externally threaded portion threadably engaged with the nut 336 is formed on the tip end portion of the small-diametered portion 339, and a head 342 for engaging a tool (for example, a hexagonal wrench) is formed on the base end portion of the large-diametered portion 340. The small-diametered portion 339 is loosely insertable into the through-hole 337, while the large-diametered portion 340 cannot pass through this through-hole 337. To fix the rear end portion of the restraining member 309 to the support bracket 305, an externally threaded portion formed on the tip end portion of the fixing bolt 338 is brought into threadable engagement with the nut 336 and is fastened, and the rear end portion of the restraining member 309 is firmly held between the stepped portion 341 and the underside of the support bracket 305.

On the basis of the fastening of the fixing bolt 338, the restraining member 309 is supported relative to the support bracket 305 at longitudinally two locations and is immovably fixed to the underside of this support bracket 305. The mounting angle with respect to the direction of tooth trace of the fixed side meshing teeth 310 is freely adjustable within a range in which inside the through-hole 337, the small-diametered portion 339 of the fixing bolt 338 can be displaced in the widthwise direction (the front to back direction as viewed in FIG. 20 and the vertical direction as viewed in FIG. 21) of the restraining member 309. So, to adjust the mounting angle of the restraining member 309 in order to reliably bring the fixed side meshing teeth 310 and the displacement side meshing teeth 313 into meshing engagement with each other, the fixing bolt 338 is loosened and the fixed side meshing teeth 310 and the displacement side meshing teeth 313 are brought into engagement with each other with the restraining member 309 rendered pivotally movable about the engagement portion based on the fitting of the concave hole 330 and the convex portion 331 to each other.

If with the fixing bolt 338 thus loosened, the fixed side meshing teeth 310 and the displacement side meshing teeth 313 are brought into meshing engagement with each other, the direction of the displacement side meshing teeth 313 and the direction of the fixed side meshing teeth 310 will strictly coincide with each other and these meshing teeth 310 and 313 will reliably mesh with each other without any backlash. So, if with these meshing teeth 310 and 313 remaining in meshing engagement with each other, the fixing bolt 338 is fastened and the rear end portion of the restraining member 309 is supported on and fixed to the support bracket 305, the restraining member 309 can be supported on and fixed to the support bracket 305 with the fixed side meshing teeth 310 and the displacement side meshing teeth 313 reliably meshing with each other.

The large-diametered portion 340 of the fixing bolt 338 is loosely inserted in a through-hole 343 long in the longitudinal direction thereof (the right to left direction as viewed in FIGS. 20 and 21) which is formed in the intermediate portion of the engagement member 312, and protrudes downwardly from the underside of this engagement member 312. The head 342 of the fixing bolt 338 cannot pass through the through-hole 343. Accordingly, the engagement member 312 has its downward pivotal movement limited not only by the engagement between the through-hole 328 and the pin 329, but also by the engagement between the through-hole 343 and the head 342. A resilient member such as a leaf spring may be provided between the underside of the engagement member 312 and the upper surface of the head 342, whereby a resilient force for bringing the fixed side meshing teeth 310 and the displacement side meshing teeth 313 into meshing engagement with each other can be imparted to the engagement member 312.

Further, between the support bracket 305 and the rear steering column 304, there is provided a support spring 344 sufficient to support the weight of the rear steering column 304 and a member such as a steering wheel supported by this rear steering column 304. In the illustrated embodiment, as this support spring 344 use is made of a compression spring provided between the underside portion of the support bracket 305 and the underside portion of the rear steering column 304. However, a tension spring provided between the upper surface portion of the support bracket 305 and the upper surface portion of the rear steering column 304 may also be adapted. In any case, it is to be understood that the resilient force of the support spring 344 is limited enough to substantially support the weight of the member supported by the rear steering column 304. This is for preventing the steering wheel from lowering with force (when the support spring is absent or when its resilient force is too small) or from rising with force (when the resilient force of the support spring is too great) when the meshing engagement between the displacement side meshing teeth 313 and the fixed side meshing teeth 310 is released.

When by the tilt type steering apparatus of the present embodiment constructed as described above, the height position of the steering wheel is to be adjusted in conformity with a driver' constitution or the like, the tilt lever 307 is first pivotally moved counter-clockwisely as viewed in FIG. 20 against the resilient force of the tension spring 321 to thereby lower the tip end portion of the arm portion 327. On the basis of this operation, the upper edge of the through-hole 328 pushes the upper surface of the pin 329 and the engagement member 312 is pivotally moved counter-clockwisely as viewed in FIG. 20 about the second lateral shaft 326. With this pivotal movement, the engagement between the displacement side meshing teeth 313 and the fixed side meshing teeth 310 is released.

In this state, the rear steering column 304 is pivotally moved about the lateral shafts 306, 306 to thereby adjust the height position of the steering wheel, not shown, which is fixed to the rear end portion of the rear steering shaft 323. This adjusting work can be done easily by the presence of the support spring 344. During the adjusting work, however, the tilt lever 307 is kept pivotally moved against the resilient force of the tension spring 321. After the adjustment, the force so far imparted to the tilt lever 307 is released and this tilt lever 307 is pivotally moved clockwisely as viewed in FIG. 20 by the resilient force of the tension spring 321. As a result, the lower edge of the through-hole 328 pushes the underside of the pin 329 upwardly and pivotally moves the engagement member 312 clockwisely as viewed in FIG. 20 about the second lateral shaft 326. With this pivotal movement, the displacement side meshing teeth 313 come into meshing engagement with the fixed side meshing teeth 310 on the basis of the resilient force of the support spring 344. As a result, the steering wheel is fixed at a height position after the adjustment. The present invention can also be carried out in the aforedescribed prior-art structure shown in FIGS. 5 to 8.

The present invention, which is constructed and acts as described above, can inexpensively realize a tilt type steering apparatus in which reduced costs and an improved feeling of operation are compatible and a steering wheel is free of backlash and moreover, the feeding of operation of a tilt lever is good.

What is claimed is:

1. A pivotally movable support apparatus for tilt steering provided with a support bracket supported on and fixed to a vehicle, a pair of parallel vertical plate portions provided on said support bracket, a steering column disposed between said pair of vertical plate portions, and a pair of pivot pins disposed coaxially with each other and extended between right and left sides of said steering column and said pair of vertical plate portions, wherein said steering column is provided with a pair of small-diametered circular holes coaxial with each other, end portions of said pair of small-diametered circular holes opening into the right and left sides of said steering column, a pair of large-diametered circular holes are formed in portions fixed to said vertical plate portions, each of said large-diametered circular holes being aligned with a respective one of said small-diametered circular holes, said pair of pivot pins each comprise a small-diametered portion and a large-diametered portion connected together by a stepped portion, said small-diametered portions being inserted in said small-diametered circular holes for relative rotation of the steering column to the support bracket with said large-diametered portions being forced into said large-diametered circular holes, and a respective restraining concave groove is formed in an outer peripheral surface of an intermediate portion of each of said large-diametered portions over the entire circumference thereof, a respective rectangular restraining hole is formed by a portion of each of said vertical plate portions in a direction transverse to an axis of a respective one of said large-diametered circular holes, and each of a pair of restraining pins inserted respectively in said rectangular restraining holes has a portion which enters a respective one of said restraining concave grooves.

2. A tilt steering apparatus provided with a support bracket supported on and fixed to a vehicle, a pair of parallel vertical plate portions provided on said support bracket, a steering column disposed between said pair of vertical plate portions, a pair of pivot pins disposed coaxially with each other and extended between right and left sides of said steering column and said pair of vertical plate portions, a restraining mechanism provided between said support bracket and said steering column for blocking pivotal movement of said steering column about said pair of pivot pins during engagement, and a tilt lever for engaging and disengaging said restraining mechanism, wherein said tilt lever is provided with a pair of parallel pivotally movable arm portions, a pair of circular holes formed respectively in tip end portions of said pivotally movable arm portions, and a connecting plate portion connecting base end portions of said pivotally movable arm portions together, an outer end portion of each of said pivot pins protrudes from an outer side of a respective one of said vertical plate portions by an amount equal to or greater than a plate thickness of each of said pivotally movable arm portions, said circular holes are fitted on the outer end portions of said pivot pins to thereby support said tilt lever for pivotal movement about said pair of pivot pins, and resilience of said pair of pivotally movable arm portions forces said pair of pivotally movable arm portions against said support bracket.

* * * * *